US010941312B2

(12) United States Patent
Frutos et al.

(10) Patent No.: US 10,941,312 B2
(45) Date of Patent: Mar. 9, 2021

(54) SYNTHETIC COATING FOR CELL CULTURE

(71) Applicant: Corning Incorporated, Corning, NY (US)

(72) Inventors: Anthony Glenn Frutos, Painted Post, NY (US); David Henry, Fontaine le Port (FR); Corinne Walerack, Veneux les Sablons (FR)

(73) Assignee: Corning Incorporated, Corning, NY (US)

( * ) Notice: Subject to any disclaimer, the term of this patent is extended or adjusted under 35 U.S.C. 154(b) by 6 days.

(21) Appl. No.: 16/196,516

(22) Filed: Nov. 20, 2018

(65) Prior Publication Data

US 2019/0153256 A1 May 23, 2019

Related U.S. Application Data

(60) Continuation of application No. 14/970,618, filed on Dec. 16, 2015, now Pat. No. 10,611,924, which is a (Continued)

(51) Int. Cl.
*C09D 151/00* (2006.01)
*C09D 189/00* (2006.01)
(Continued)

(52) U.S. Cl.
CPC ............ *C09D 151/00* (2013.01); *B05D 3/06* (2013.01); *C09D 189/00* (2013.01); *C08F 220/20* (2013.01); *C08F 220/286* (2020.02)

(58) Field of Classification Search
CPC .................................................. C09D 151/00
See application file for complete search history.

(56) References Cited

U.S. PATENT DOCUMENTS 5,045,631 A 9/1991 Kimizuka et al.
5,498,407 A 3/1996 Atlas
(Continued)

FOREIGN PATENT DOCUMENTS

EP 2264486 A2 12/2010
WO 2002054136 A2 7/2002
(Continued)

OTHER PUBLICATIONS

L. Griffith et al. "Nanoscale Clustering of RGD Peptides at Surfaces Using Comb Polymers." Biomacromolecules, vol. 2, N° .2, 2001.
(Continued)

*Primary Examiner* — Dah-Wei D. Yuan
*Assistant Examiner* — Andrew J Bowman
(74) *Attorney, Agent, or Firm* — Annie J. Kock

(57) ABSTRACT

A method for coating a surface of a cell culture article includes dissolving a polymer having a covalently attached polypeptide in an aqueous solution to produce a polymer solution. The polymer is formed from monomers selected to form a polymer having a linear backbone, wherein the polymer is crosslink free. The weight percentage of the polypeptide relative to the polymer conjugated to the polypeptide is sufficiently high to render the polymer conjugated to the polypeptide water soluble. The aqueous solution is substantially free of organic solvents. The method further includes (i) disposing the polymer solution on the surface of the cell culture article to produce a coated article; and (ii) subjecting the coated article to sufficient heat or electromagnetic radiation to attach the polymer conjugated to a polypeptide to the surface of the cell culture article.

15 Claims, 13 Drawing Sheets

Related U.S. Application Data division of application No. 13/420,735, filed on Mar. 15, 2012, now Pat. No. 9,222,000.

(60) Provisional application No. 61/453,654, filed on Mar. 17, 2011.

(51) Int. Cl.
*B05D 3/06* (2006.01)
*C08F 220/20* (2006.01)
*C08F 220/28* (2006.01)

(56) References Cited

U.S. PATENT DOCUMENTS

| | | | |
|---|---|---|---|
| 5,643,561 | A | 7/1997 | Katsuen et al. |
| 6,008,037 | A * | 12/1999 | Ellis .................... A61L 12/082 435/177 |
| 6,150,459 | A | 11/2000 | Mayes et al. |
| 6,367,929 | B1 | 4/2002 | Maiden et al. |
| 7,030,213 | B2 | 4/2006 | Pierschbacher et al. |
| 7,786,213 | B2 | 8/2010 | Maynard et al. |
| 7,838,629 | B2 | 11/2010 | Fiedler et al. |
| 8,883,928 | B2 | 11/2014 | Chang et al. |
| 2003/0036710 | A1 | 2/2003 | Matriano et al. |
| 2004/0204554 | A1 | 10/2004 | Ko et al. |
| 2005/0106227 | A1 | 5/2005 | Zalipsky et al. |
| 2007/0190036 | A1 | 8/2007 | Kizilel et al. |
| 2009/0191627 | A1 | 7/2009 | Fadeev et al. |
| 2009/0191632 | A1 | 7/2009 | Fadeev et al. |
| 2009/0191633 | A1 | 7/2009 | Shogbon et al. |
| 2010/0304482 | A1 | 12/2010 | Deshayes et al. |
| 2011/0207216 | A1 | 8/2011 | Martin et al. |
| 2011/0207219 | A1 | 8/2011 | Bookbinder et al. |

FOREIGN PATENT DOCUMENTS

| | | |
|---|---|---|
| WO | 2006105278 A2 | 10/2006 |
| WO | 2009073401 A3 | 6/2009 |
| WO | 2009099555 A2 | 8/2009 |
| WO | 2009120893 A3 | 10/2009 |
| WO | 2011014605 A1 | 2/2011 |
| WO | 2012014003 A1 | 2/2012 |

OTHER PUBLICATIONS

Guruvenket et al., "Wettability Enhancement of Polystyrene with Electron Cyclontron Reosnance Plasma with Argon", 2003, Journal of Applied Polymer Science, vol. 90, pp. 1618-1623.

Shen et al., Investigation of surface endothelialization on biomedical nitinol (NiTi) alloy: Effects of surface micropatterningcombined with plasma nanocoatings, 2009, Acta Biomaterialia, vol. 5, pp. 3593-3604.

Marx. "Platlet-Rich Plasma: Evidence to Support its Use," Journal of Oral Maxilofacial Surgery, vol. 62, pp. 489-496.

Faris. B et al: "Effect of protein-hydroxyethylmethacrylate hydrogels on cultured endothelial cells" Experimental Cell Research, Academic Press, US, vol. 143, No. 1, 1983, pp. 15-25.

Kroupova Jana et al., "Functional polymer hydrogels for embryonic stem cell support", Journal of Biomedical Materials Research, Wiley, New York, NY, US, vol. 76B, No. 2, 2006, pp. 315-325.

Changhong Zhang et al., Synthesis and characterization of biocompatible, degradable. light-curable, polyurethane-based elastic hydrogels, Journal of Biomedical Materials Research, Part A., vol. 82A. No. 3., 2007, pp. 637-650.

Besse et al; "Synthesis of Selenocysteine Peptides and Their Oxidation to Diselenide-Bridged Compounds"; Journal of Peptide Science, vol. 3, pp. 442-453 (1997).

Koide et al; "Syntheses and Biological Activities of Selenium Analogs of α-Rat Atrial Natriuretic Peptide"; Chem. Pharm. Bull. 41 (9) 1596-1600 (1993).

Koide et al; "Synthetic Study on Selenocystine-Containing Peptides"; Chem. Pharm. Bull. 41 (3) 502-506 (1993).

* cited by examiner

| Surface | Viable Cells/Well | % Viability | Fold Expansion |
|---|---|---|---|
| Synthemax | 522700 | 97 | 7.5 |
| Disclosed Coating | 531650 | 96 | 7.6 |
| MesenCult | 580000 | 94 | 8.3 |
FIG. 13
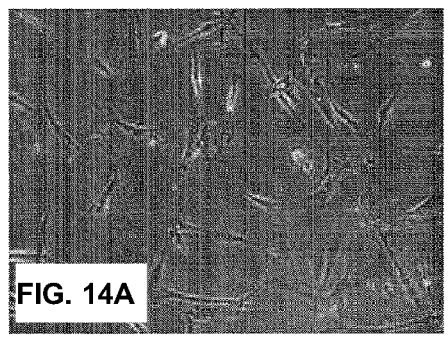
FIG. 14A
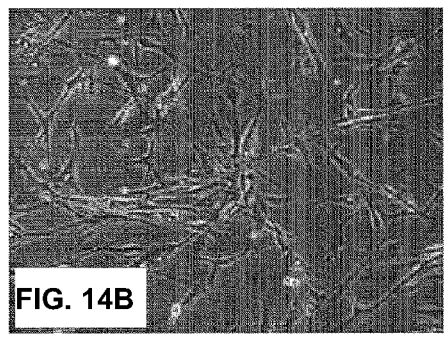
FIG. 14B
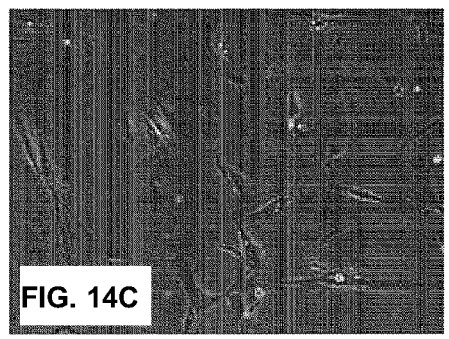
FIG. 14C
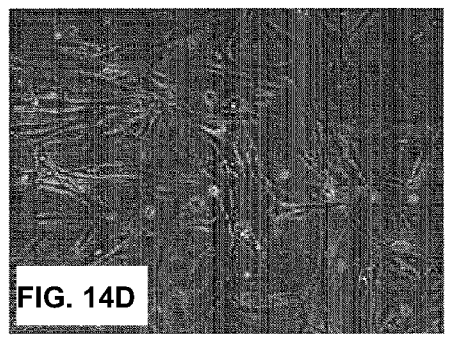
FIG. 14D

SYNTHETIC COATING FOR CELL CULTURE

CROSS-REFERENCE TO RELATED APPLICATIONS

This application is a continuation of U.S. patent application Ser. No. 14/970,618 filed on Dec. 16, 2015, which is a divisional of application Ser. No. 13/420,735 filed on Mar. 15, 2012, which in turn claims the benefit of priority to Provisional Application No. 61/453,654 filed on Mar. 17, 2011, the content of which is relied upon and incorporated herein by reference in its entirety, and the benefit of priority under 35 U.S.C. § 120 is hereby claimed.

FIELD

The present disclosure relates to cell culture, and more particularly to synthetic, chemically-defined coatings or surfaces and methods to prepare such coatings or surfaces.

BACKGROUND

Anchorage dependant cells are typically cultured in the presence of surfaces or media containing animal-derived components, such as feeder layers, serum, collagen, fibronectin, vitronectin, Matrigel™, and the like, to facilitate anchoring of the cells to a surface.

One advantage of many animal-derived biological coatings is their ability to be prepared using simple protocols, which can be practiced without special and cumbersome equipment. For example, coatings made from cell adhesion proteins are performed by dissolving the proteins in water at an appropriate concentration and pH, dispensing the appropriate volume onto the surface of the article to be coated, incubating for an appropriate time and temperature, and rinsing to wash off the unbound materials. Typically, no chemical crosslinking step is required, which avoids the use of specific chemical or physical processes for stable immobilization of the cell adhesion proteins on the article surface.

However, animal-derived additions to the culture environment expose cells to potentially harmful viruses or other infectious agents, which could compromise general culture and maintenance of the cells and could be transferred to patients if the cells or products of the cells are to be used for therapeutic purposes. In addition, such biological products are vulnerable to batch variation, immune response and limited shelf-life.

Therefore, methods of producing synthetic cell culture surfaces that are capable of supporting cells in chemically defined or serum-free media, are desirable. This is particularly true for cells that may be used in patients for therapeutic purposes, such as pluripotent stem cells, which have the ability to differentiate into any of the three germ layers, giving rise to any adult cell type.

To overcome the risk of contamination and batch variation, recombinant proteins having cell-adhesive properties have been proposed. However, such techniques are often complex, require extensive purification, and are expensive. Others have proposed in situ formation of swellable polymers from monomers to which cell adhesive polypeptides may be grafted. However, such techniques require careful control of casting of monomers and solvent evaporation to produce homogenous surfaces, complex equipment for UV curing, and complex chemistry for polypeptide grafting.

Another way to solve the issues encountered with biological coatings includes coating water-insoluble polymers and associated cell adhesive polypeptides or ligands on the surfaces of cell culture articles. The polymers and associated cell adhesive polypeptides are water-insoluble so that they do not release or dissolve in the presence of an aqueous cell culture medium. However, as the polymer-polypeptide/ligand polymers are water-insoluble, they cannot be used for coating from aqueous solution as done usually with biological attachment factors. In addition, such processes tend to suffer from inhomogeneous coating without careful control of dispensing and solvent evaporation and may not be practicable with various formats such as large vessels or small wells from multiwell plates due to variable evaporation rates occurring within such different formats.

There is still a need for a simple coating process using a synthetic polymer to prevent potential xenogenic contamination and batch to batch variability but that can be performed simply as usually done with animal derived biological attachment factors.

BRIEF SUMMARY

Among other things, the present disclosure describes methods for making cell culture articles by contacting the articles with an aqueous solution containing a synthetic polymer having a conjugated polypeptide and exposing the coated articles to heat or electromagnetic radiation to produce a cell culture article with a cell attachment surface. The synthetic polymer and conjugated polypeptide described herein are soluble in cold or room temperature water but become securely attached to a substrate when exposed to heat or electromagnetic radiation, such as UV light. The polymers are free of crosslinkers in many embodiments, yet the attachment strength of the synthetic polymer deposited to the substrate from aqueous solution is strong enough to resist stringent washing with buffers or with surfactant aqueous solutions and may also resist delamination during ethanol sanitization. Being aqueous based, the synthetic compositions and methods described herein can, in many embodiments, produce homogeneous coating surfaces similar to their animal derived counterparts, with less batch to batch variation and reduced potential for xenobiotic contamination.

In various embodiments described herein, a method for coating the surface of a cell culture article includes dissolving a polymer having a covalently attached polypeptide in an aqueous solution to produce a polymer solution. The polymer is formed from monomers selected to form a linear polymer backbone. The polymer is free of crosslinks. The weight percentage of the polypeptide relative to the polymer conjugated to the polypeptide is sufficiently high to render the polymer conjugated to the polypeptide water soluble. The aqueous solution is substantially free of organic solvents. The method further includes (i) disposing the polymer solution on the surface of the cell culture article to produce a coated article; and (ii) subjecting the coated article to sufficient heat or electromagnetic radiation to attach the polymer conjugated to a polypeptide to the surface of the cell culture article.

One or more embodiments of the cell culture articles, compositions, or methods described herein provide one or more advantages over prior cell culture articles, compositions, or methods for producing coated cell culture articles. For example, because the coating is fully synthetic, it does not suffer from batch variation, immune response, limited shelf-life and risk of exposure of the cells to potentially harmful viruses or other infectious agents which could be transferred to patients. The coating process is simple to practice and is comparable to protocols performed with animal-derived biological attachment factors, not complex like other processes employing synthetic coatings. Further, the coating process does not require the use of expensive and cumbersome equipment, such as equipment needed to apply an inert gas blanket or purges. The process is aqueous based, and thus is cheaper and more user and environment friendly than processes requiring organic solvents. The compositions and methods enable coating of a wide range of vessel formats, which can be coated with high uniformity at low costs. Even complex 3D shaped substrates, such as beads or porous 3D materials, can be coated using the compositions and processes described herein, which is not the case with processes using in situ polymerization process. Another advantage over in situ polymerization processes includes the ability to perform quality control review of the polymers before coating to ensure that the composition of the coating is always the same. Additionally, due to the simplified coating process, composition can be provided as a kit for use in coating by an end user in almost any laboratory setting. These and other advantages will be readily understood from the following detailed descriptions when read in conjunction with the accompanying drawings.

BRIEF DESCRIPTION OF THE DRAWINGS

FIG. 13 is a table showing cell viability, fold expansion data for hMSC cultured on Corning Synthemax™, Mesencult™ attachment substrate and a coating according to an embodiment presented herein.

FIGS. 14A-D are photomicrographs showing morphology of bone marrow-derived hMSC, 2 and 4 days after seeding on coating according to an embodiment described herein (FIG. 14A and FIG. 14B) and MesenCult® attachment substrate biological coating (FIG. 14C and FIG. 14D).

(FIG. 16A) cells seeded without ethanol sanitization; (FIG. 16B) cells seed following 1 hour sanitization with 70% ethanol.

Figure 1:
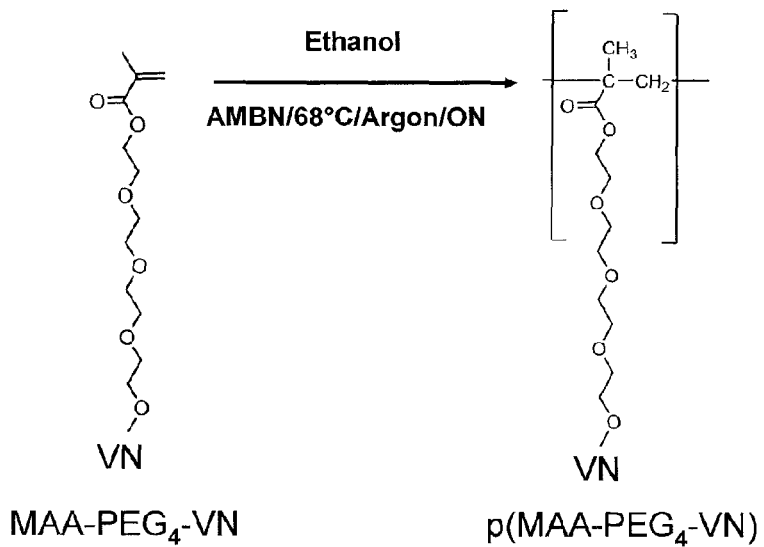
FIG. 1 is a reaction scheme for making a poly(MAA-PEG4-VN) homopolymer having a conjugated cell adhesive polypeptide.

The schematic drawings in are not necessarily to scale. Like numbers used in the figures refer to like components, steps and the like. However, it will be understood that the use of a number to refer to a component in a given figure is not intended to limit the component in another figure labeled with the same number. In addition, the use of different numbers to refer to components is not intended to indicate that the different numbered components cannot be the same or similar.

DETAILED DESCRIPTION

In the following detailed description, reference is made to the accompanying drawings that form a part hereof, and in which are shown by way of illustration several specific embodiments of devices, systems and methods. It is to be understood that other embodiments are contemplated and may be made without departing from the scope or spirit of the present disclosure. The following detailed description, therefore, is not to be taken in a limiting sense.

All scientific and technical terms used herein have meanings commonly used in the art unless otherwise specified. The definitions provided herein are to facilitate understanding of certain terms used frequently herein and are not meant to limit the scope of the present disclosure.

As used in this specification and the appended claims, the singular forms "a", "an", and "the" encompass embodiments having plural referents, unless the content clearly dictates otherwise. As used in this specification and the appended claims, the term "or" is generally employed in its sense including "and/or" unless the content clearly dictates otherwise.

As used herein, "have", "having", "include", "including", "comprise", "comprising" or the like are used in their open ended sense, and generally mean "including, but not limited to". It will be understood that "consisting essentially of", "consisting of", and the like are subsumed in "comprising" and the like.

As used herein, "conjugated," as it relates to a monomer or polymer and a polypeptide, means that the polypeptide is covalently bound, either directly or indirectly (e.g., via a spacer) to the polymer or monomer.

As used herein, "monomer" means a compound capable of polymerizing with another monomer, (regardless of whether the "monomer" is of the same or different compound than the other monomer).

As used herein, a "(meth)acrylate monomer" means a methacrylate monomer or an acrylate monomer. As used herein "(meth)acrylamide monomer" means a methacrylamide or an acrylamide monomer. (Meth)acrylate and (meth)acrylamide monomers have at least one ethylenically unsaturated moiety. "Poly(meth)acrylate", as used herein, means a polymer formed from one or more monomers including at least one (meth)acrylate monomer. "Poly(meth)acrylamide", as used herein, means a polymer formed from one or more monomers including at least one (meth)acrylamide monomer.

As used herein, a polymer without conjugated polypeptide that is "substantially similar" to a polymer conjugated to the polypeptide is a polymer that formed in the same manner as the polymer conjugated to the polymer conjugated to the polypeptide except that the polypeptide is not included. For example, a polypeptide may be conjugated to a polymer via grafting after the polymer is formed. In such cases, the substantially similar polymer that is not conjugated to the polypeptide is the polymer that has not been grafted. By way of further example, a monomer may be derivatized with a polypeptide and the polypeptide may be incorporated into the polymer as the monomer is polymerized or copolymerized. In such cases, the substantially similar polymer that is not conjugated to the polypeptide is a polymer formed under the same reaction conditions as the polymer conjugated to the polypeptide except that the monomer is not derivatized with the polypeptide.

Polypeptide sequences are referred to herein by their one letter amino acid codes or by their three letter amino acid codes. These codes may be used interchangeably.

As used herein, "peptide" and "polypeptide" mean a sequence of amino acids that may be chemically synthesized or may be recombinantly derived, but that are not isolated as entire proteins from animal sources. For the purposes of this disclosure, peptides and polypeptides are not whole proteins. Peptides and polypeptides may include amino acid sequences that are fragments of proteins. For example peptides and polypeptides may include sequences known as cell adhesion sequences such as RGD. Polypeptides may be of any suitable length, such as between three and 30 amino acids in length. Polypeptides may be acetylated (e.g. Ac-LysGlyGly) or amidated (e.g. SerLysSer-NH$_2$) to protect them from being broken down by, for example, exopeptidases. It will be understood that these modifications are contemplated when a sequence is disclosed.

The present disclosure describes, inter alia, compositions and methods for coating cell culture articles by contacting the articles with an aqueous solution containing a synthetic polymer having a conjugated polypeptide and exposing the coated articles to heat or electromagnetic radiation to produce a cell culture article with a cell attachment surface. The synthetic polymer and conjugated polypeptide described herein are soluble in cold (e.g., less than 20° C.) or room temperature (25° C.) water but become securely attached to a substrate when exposed to heat or electromagnetic radiation, such as UV light. Despite the polymers being free of crosslinkers in many embodiments, they attach to the substrate with sufficient strength to resist stringent washing with buffers or with surfactant aqueous solutions, and may also resist delamination during ethanol sanitization. Being aqueous based, the synthetic compositions and methods described herein can, in many embodiments, produce homogeneous coating surfaces similar to animal-derived cell adhesion factors, but with less batch to batch variation and reduced potential for xenobiotic contamination.

Polymer

The polymers conjugated to polypeptide described herein are water soluble at room temperature. However, in many embodiments, a substantially similar polymer that is not conjugated to the polypeptide is not water soluble at room temperature. In such embodiments, the polypeptide serves to render the polymers conjugated to polypeptide water soluble. Preferably, the substantially similar polymer that is not conjugated to the polypeptide is not water soluble at cell culture temperatures, which is typically 37° C. It may also be desirable for the polymer to be swellable in water at 37° C., to provide a suitable modulus for cell culture.

The polymers conjugated to the polypeptides may be formed by any suitable process using any suitable monomers. In embodiments, the one or more monomers used to form the polymer and the reaction mechanisms (e.g., step-growth polymerization or condensation polymerization, or chain polymerization or addition polymerization) used to form the polymer are selected to form polymers with linear polymer backbones. In embodiments, the resulting polymers are free of crosslinks.

In many embodiments, the monomers used to form the polymers contain an ethylenically unsaturated group, such as (meth)acrylates, (meth)acrylamides, maleimides, fumurates, vinylsulfones, or the like. The polymers may be homopolymers or copolymers. The monomers may be chosen such that the polymer is insoluble in water at 37° C., but is soluble in water in the range of 4° C. to 25° C. when conjugated to the polypeptide.

In various embodiments, a monomer employed is a (meth)acrylate monomer of Formula (I):

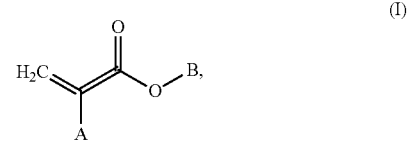

where A is H or methyl, and where B is H, C1-C6 straight or branched chain alcohol or ether, or C1-C6 straight or branched chain alkyl substituted with a carboxyl group (—COOH). In some embodiments, B is C1-C4 straight or branched chain alcohol. In some embodiments, B is straight or branched chain C1-C3 substituted with a carboxyl group. By way of example, 2-carboxyethyl methacrylate, 2-carboxyethyl acrylate, acrylic acid, methacrylic acid, hydroxypropyl methacrylate, 2-hydroxyethyl methacrylate, 2-hydroxyethyl acrylate, glycerol methacrylate, hydroxypropyl acrylate, 4-hydroxybutyl acrylate, or the like may be employed.

In various embodiments, a monomer employed is a (meth)acrylamide monomer of Formula (II):

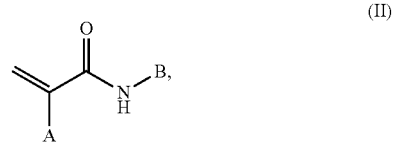

where A is hydrogen or methyl, and where B is H, C1-C6 straight or branched chain alcohol or ether, or C1-C6 straight or branched chain alkyl substituted with a carboxyl group (—COOH). In some embodiments, B is straight or branched chain C1-C3 substituted with a carboxyl group. In some embodiments, B is C1-C4 straight or branched chain alcohol. By way of example, 2-carboxyethyl acrylamide, acrylamidoglycolic acid, N-(hydroxymethyl)acrylamide, N-[Tris (hydroxymethyl)methyl]acrylamide, 3-acryloylamino-1-propanol, N-acrylamido-ethoxyethanol, N-hydroxyethyl acrylamide, or the like, may be used.

The monomer or monomers used to form the polymer may be selected to achieve a polymer having the desired characteristics (e.g., modulus, swellability, water solubility). For example, copolymers formed from more than one monomer may have a greater degree of swellability than homopolymers formed from any one of the monomers alone. Generally, monomers having longer chain alkyl groups will tend to render the polymer too water insoluble for the conjugated polypeptide to make the polymer-polypeptide water soluble at appropriate temperatures. Additionally, monomers having moieties that favor hydrogen bonding or that are charged at selected pH levels may tend to make the polymer more water soluble. One of skill in the art will readily be able to select the appropriate monomers and monomer ratios for preparing polymers having desired characteristics.

Once the appropriate monomers in the appropriate amounts are selected, the polymer may be formed via polymerization reaction. In addition to the monomers that form the polymer, a composition may include one or more additional compounds such as surfactants, wetting agents, photoinitiators, thermal initiators, catalysts, and activators.

Any suitable polymerization initiator may be employed. One of skill in the art will readily be able to select a suitable initiator, e.g. a radical initiator or a cationic initiator, suitable for use with the monomers. In various embodiments, UV light is used to generate free radical monomers to initiate chain polymerization. Examples of polymerization initiators include organic peroxides, azo compounds, quinones, nitroso compounds, acyl halides, hydrazones, mercapto compounds, pyrylium compounds, imidazoles, chlorotriazines, benzoin, benzoin alkyl ethers, diketones, phenones, or mixtures thereof. Examples of suitable commercially available, ultraviolet-activated and visible light-activated photoinitiators have tradenames such as IRGACURE 651, IRGACURE 184, IRGACURE 369, IRGACURE 819, DAROCUR 4265 and DAROCUR 1173 commercially available from Ciba Specialty Chemicals, Tarrytown, N.Y. and LUCIRIN TPO and LUCIRIN TPO-L commercially available from BASF (Charlotte, N.C.)

A photosensitizer may also be included in a suitable initiator system. Representative photosensitizers have carbonyl groups or tertiary amino groups or mixtures thereof. Photosensitizers having a carbonyl groups include benzophenone, acetophenone, benzil, benzaldehyde, o-chlorobenzaldehyde, xanthone, thioxanthone, 9,10-anthraquinone, and other aromatic ketones. Photosensitizers having tertiary amines include methyldiethanolamine, ethyldiethanolamine, triethanolamine, phenylmethyl-ethanolamine, and dimethylaminoethylbenzoate. Commercially available photosensitizers include QUANTICURE ITX, QUANTICURE QTX, QUANTICURE PTX, QUANTICURE EPD from Biddle Sawyer Corp.

In general, the amount of photosensitizer or photoinitiator system may vary from about 0.01 to 10% by weight.

Examples of cationic initiators that may be employed include salts of onium cations, such as arylsulfonium salts, as well as organometallic salts such as ion arene systems.

Examples of free radical initiators that may be employed include azo-type initiators such as 2-2'-azobis(dimethyl-valeronitrile), azobis(isobutyronitrile), azobis(cyclohexane-nitrite), azobis(methyl-butyronitrile), and the like, peroxide initiators such as benzoyl peroxide, lauroyl peroxide, methyl ethyl ketone peroxide, isopropyl peroxy-carbonate, 2,5-dienethyl-2,5-bas(2-ethylhexanoyl-peroxy)hexane, di-tert-butyl peroxide, cumene hydroperoxide, dichlorobenzoyl peroxide, potassium persulfate, ammonium persulfate, sodium bisulfate, combination of potassium persulfate, sodium bisulfate and the like, and mixtures thereof. Of course, any other suitable free radical initiators may be employed. An effective quantity of an initiator is generally within the range of from about 0.1 percent to about 15 percent by weight of the reaction mixture, such as from 0.1 percent to about 10 percent by weight or from about 0.1 percent to about 8 percent by weight of the reaction mixture.

In various embodiments, one or more monomers are diluted prior to undergoing polymerization.

The polymer resulting from the polymerization reaction may have any suitable molecular weight. In various embodiments, the polymer haves an average molecular weight (Mw) of between 10,000 and 1000,000 Daltons, such as between 10,000 and 250,000 Daltons. One of skill in the art will understand that the amount of initiator, reaction time, reaction temperature, and the like may be varied to adjust the molecular weight of the resulting polymer.

(Meth)acrylate monomers, (meth)acrylamide monomers, or other suitable monomers may be synthesized as known in the art or obtained from a commercial vendor, such as Polysciences, Inc., Sigma Aldrich, Inc., and Sartomer, Inc.

Polypeptide Incorporation

The polypeptide may be conjugated to the polymer in any suitable manner. In some embodiments a monomer is derivatized to include the polypeptide and, thus, the polypeptide is incorporated into the polymer as it is being formed. In some embodiments, the polypeptide is grafted to the polymer after the polymer is formed.

Figure 2:
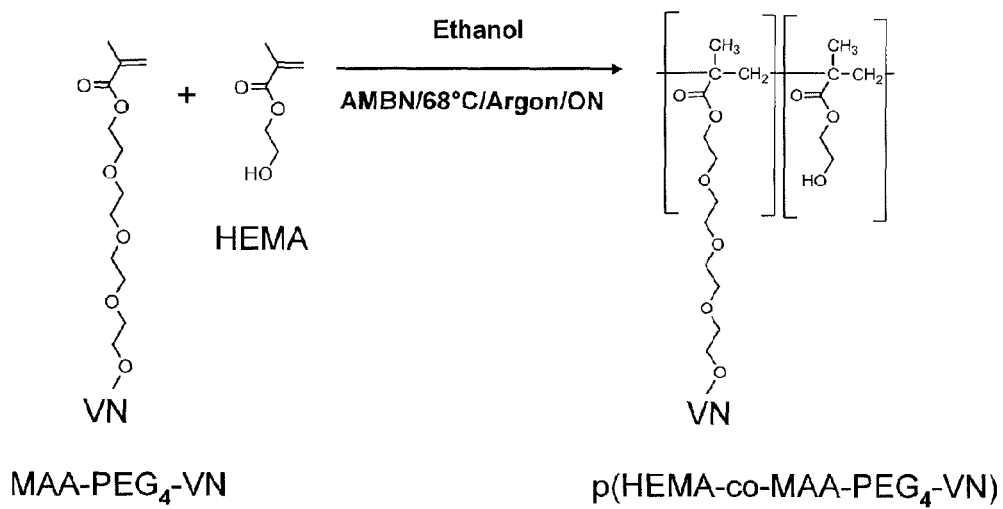
FIG. 2 is a reaction scheme for making a poly(HEMA-co-MAA-PEG4-VN) copolymer having a conjugated cell adhesive polypeptide.

Referring now to FIGS. 1-2 examples of reaction schemes for incorporating a polypeptide into a polymer as it is being formed is shown. In FIG. 1, a vitronectin polypeptide (VN) is conjugated to methacrylate (MAA) via a repeating polyethylene glycol (PEG$_4$) spacer. A homopolymer is produced by polymerizing the monomer (MMA) that is conjugated to the polypeptide (VN) under appropriate conditions. In the depicted embodiment, ethanol is the solvent, 2,2'-Azodi(2-methylbutyronitrile) (AMBN) is the thermal initiator, the reaction temperature is 68° C., and the reaction is carried out under argon.

A monomer may be derivatized to include a polypeptide using any suitable process, such as described in Example 1 presented herein. Well known processes for preparing polypeptide-monomers are described in US2007/0190036, published on Aug. 16, 2007, naming Kizilel, S., et al. as inventors. Of course, other methods for derivatizing a monomer with a polypeptide may be used.

In the embodiment depicted in FIG. 2, a copolymer is formed from 2-hydroxyethylmethacrylate (HEMA) and MMA-PEG$_4$-VN under similar reaction conditions to those described with regard to FIG. 1 above. The use of multiple monomers to produce the polymer allows one to more readily tune the properties of the resulting polymer as desired, regardless of whether the polypeptide is incorporated into the polymer as the polymer is formed.

In various embodiments, a polypeptide is grafted to a polymer that has already been formed. Preferably, polypeptide includes an amino acid capable of conjugating to a pendant reactive group of the polymer. Examples of reactive groups that the polymer may have for reaction with a polypeptide include maleimide, glycidyl, isocyanate, isothiocynate, activated esters, activated carbonates, anhydride, and the like. By way of example, any native or biomimetic amino acid having functionality that enables nucleophilic addition; e.g. via amide bond formation, may be included in polypeptide for purposes of conjugating to the polypeptide having a suitable reactive group. Lysine, homolysine, ornithine, diaminoproprionic acid, and diaminobutanoic acid are examples of amino acids having suitable properties for conjugation to a reactive group of the polymer, such as carboxyl group. In addition, the N-terminal alpha amine of a polypeptide may be used to conjugate to the carboxyl group, if the N-terminal amine is not capped. In various embodiments, the amino acid of polypeptide that conjugates with the microcarrier is at the carboxy terminal position or the amino terminal position of the polypeptide.

A polypeptide may be conjugated to the polymer via any suitable technique. A polypeptide may be conjugated to a polymer via an amino terminal amino acid, a carboxy terminal amino acid, or an internal amino acid. One suitable technique involves 1-ethyl-3-[3-dimethylaminopropyl] carbodiimide hydrochloride (EDC)/N-hydroxysuccinimide (NHS) chemistry, as generally known in the art. EDC and NHS or N-hydroxysulfosuccinimide (sulfo-NHS) can react with free carboxyl groups of the polymer to produce amine reactive NHS esters. EDC reacts with a carboxyl group of the polymer to produce an amine-reactive O-acylisourea intermediate that is susceptible to hydrolysis. The addition of NHS or sulfo-NHS stabilizes the amine-reactive O-acylisourea intermediate by converting it to an amine reactive NHS or sulfo-NHS ester, allowing for a two-step procedure. Following activation of the polymer, the polypeptide may then be added and the terminal amine of the polypeptide can react with the amine reactive ester to form a stable amide bond, thus conjugating the polypeptide to the polymer layer. When EDC/NHS chemistry is employed to conjugate a polypeptide to the polymer, the N-terminal amino acid is preferably an amine containing amino acid such as lysine, ornithine, diaminobutyric acid, or diaminoproprionic acid. Of course, any acceptable nucleophile may be employed, such as hydroxylamines, hydrazines, hydroxyls, and the like.

EDC/NHS chemistry results in a zero length crosslinking of polypeptide to microcarrier. Linkers or spacers, such as poly(ethylene glycol) linkers (e.g., available from Quanta BioDesign, Ltd.) with a terminal amine may be added to the N-terminal amino acid of polypeptide. When adding a linker to the N-terminal amino acid, the linker is preferably a N-PG-amido-PEGx-acid where PG is a protecting group such as the Fmoc group, the BOC group, the CBZ group or any other group amenable to peptide synthesis and X is 2, 4, 6, 8, 12, 24 or any other discrete PEG which may be available.

Of course, any other suitable mechanism for grafting the polypeptide to the polymer may be used. In addition, any suitable space may be used. A linker or spacer, such as a repeating poly(ethylene glycol) linker or any other suitable linker, may be used to increase distance from polypeptide to surface of polymer. The linker may be of any suitable length. For example, if the linker is a repeating poly(ethylene glycol) linker, the linker may contain between 2 and 10 repeating ethylene glycol units. In some embodiments, the linker is a repeating poly(ethylene glycol) linker having about 4 repeating ethylene glycol units. All, some, or none of the polypeptides may be conjugated to a polymer via linkers. Other potential linkers that may be employed include polypeptide linkers such as poly(glycine) or poly(β-alanine).

A linker may serve to provide better accessibility of the polypeptide to cells when used in cell culture. In addition, the use of a linker in embodiments where the polypeptide is conjugated to a monomer, the efficiency of polymerization of the monomer into a homopolymer or copolymer may be increased.

The polypeptide may be cyclized or include a cyclic portion. Any suitable method for forming cyclic polypeptide may be employed. For example, an amide linkage may be created by cyclizing the free amino functionality on an appropriate amino-acid side chain and a free carboxyl group of an appropriate amino acid side chain. Also, a di-sulfide linkage may be created between free sulfydryl groups of side chains appropriate amino acids in the peptide sequence. Any suitable technique may be employed to form cyclic polypeptides (or portions thereof). By way of example, methods described in, e.g., WO1989005150 may be employed to form cyclic polypeptides. Head-to-tail cyclic polypeptides, where the polypeptides have an amide bond between the carboxy terminus and the amino terminus may be employed. An alternative to the disulfide bond would be a diselenide bond using two selenocysteines or mixed selenide/sulfide bond, e.g., as described in Koide et al, 1993, Chem. Pharm. Bull. 41(3):502-6; Koide et al., 1993, Chem. Pharm. Bull. 41(9):1596-1600; or Besse and Moroder, 1997, Journal of Peptide Science, vol. 3, 442-453.

Polypeptides may be synthesized as known in the art (or alternatively produced through molecular biological techniques) or obtained from a commercial vendor, such as American Peptide Company, CEM Corporation, or GenScript Corporation. Linkers may be synthesized as known in the art or obtained from a commercial vendor, such as discrete polyethylene glycol (dPEG) linkers available from Quanta BioDesign, Ltd.

In various embodiments, the polypeptide, or a portion thereof, has cell adhesive activity; i.e., when the polypeptide is conjugated to the polymer, the polypeptide allows a cell to adhere to the surface of the peptide-containing polymer. By way of example, the polypeptide may include an amino sequence, or a cell adhesive portion thereof, recognized by proteins from the integrin family or leading to an interaction with cellular molecules able to sustain cell adhesion. For example, the polypeptide may include an amino acid sequence derived from collagen, keratin, gelatin, fibronectin, vitronectin, laminin, bone sialoprotein (BSP), or the like, or portions thereof. In various embodiments, polypeptide includes an amino acid sequence of ArgGlyAsp (RGD).

For any of the polypeptides discussed herein, it will be understood that a conservative amino acid may be substituted for a specifically identified or known amino acid. A "conservative amino acid", as used herein, refers to an amino acid that is functionally similar to a second amino acid. Such amino acids may be substituted for each other in a polypeptide with a minimal disturbance to the structure or function of the polypeptide according to well-known techniques. The following five groups each contain amino acids that are conservative substitutions for one another: Aliphatic: Glycine (G), Alanine (A), Valine (V), Leucine (L), Isoleucine (I); Aromatic: Phenylalanine (F), Tyrosine (Y), Tryptophan (W); Sulfur-containing: Methionine (M), Cysteine (C); Basic: Arginine (R), Lysine (K), Histidine (H); Acidic: Aspartic acid (D), Glutamic acid (E), Asparagine (N), Glutamine (Q).

One or more polypeptide may be conjugated to a polymer, whether grafted or incorporated during polymer formation, in any suitable amount. Preferably, weigh percentage of the polypeptide is sufficiently high to render the polymer conjugated to the polymer water soluble. In various embodiments, the weight percentage of the polypeptide relative to the polymer conjugated to the polypeptide is 40% or greater, such as 60% or greater. Such weight percentages have been determined to achieve good water solubility, immobilization efficiency and acceptable cell adhesion for polypeptides having a molecular weight of 1500 Daltons or higher.

Polymers as described herein provide a synthetic surface to which any suitable adhesion polypeptide or combinations of polypeptides may be conjugated, providing an alternative to biological substrates or serum that have unknown components. In current cell culture practice, it is known that some cell types require the presence of a biological polypeptide or combination of peptides on the culture surface for the cells to adhere to the surface and be sustainably cultured. For example, HepG2/C3A hepatocyte cells can attach to plastic culture ware in the presence of serum. It is also known that serum can provide polypeptides that can adhere to plastic culture ware to provide a surface to which certain cells can attach. However, biologically-derived substrates and serum contain unknown components. For cells where the particular component or combination of components (peptides) of serum or biologically-derived substrates that cause cell attachment are known, those known polypeptides can be synthesized and applied to a polymer as described herein to allow the cells to be cultured on a synthetic surface having no or very few components of unknown origin or composition.

Coating Composition

The polymer conjugated to the polypeptide may be dissolved in an aqueous solution for use in coating cell culture articles. The aqueous solution is free, or substantially free, of organic solvents. It will be understood that some minor amounts of organic solvents may be present in the aqueous solution, for example as a result some organic solvent remaining in the polymer after polymerization. As used herein, "substantially free," as it relates to an organic solvent in an aqueous solution, means that the aqueous solution comprises less than 2% of the organic solvent by weight. In many embodiments, the aqueous solution contains less than 1%, less than 0.5%, less that 0.2% or less that 0.1% of an organic solvent. Examples of organic solvents from which the aqueous solution is free include methanol, ethanol, butanol, propanol, octanol, hexane, heptane, acetone, acetyl acetate, ethyl acetate, dimethylformamide (DMF), dimethylsulfoxide (DMSO), and the like.

The polymer conjugated to the polypeptide may be dissolved in the aqueous solution at any suitable concentration for purposes of coating. For example, the aqueous solution may contain between 0.1 mg/ml and 0.5 mg/ml of the polymer conjugated to the polypeptide, such as between 0.2 mg/ml and 0.3 mg/ml of the polymer conjugated to the polypeptide, or about 0.25 mg/ml of the polymer conjugated to the polypeptide.

In many embodiments, the aqueous solution consists essentially of, or consists of, water and the dissolved polymer conjugated to the polypeptide. Of course, the solution may be a pH buffered solution, such as a phosphate buffered solution, may contain osmolarity adjustment agents, such as sodium chloride, potassium chloride, calcium chloride, or the like, or may include surfactants or other suitable agents.

The aqueous solution is preferably free or substantially free of cross-linking agents. As used herein, "cross-linking agent" refers to an agent capable of inducing cross-linking in, or capable of cross-linking, the polymer portion of the polymer-polypeptide. As used herein, "substantially free" as it relates to cross-linking agents, means that no appreciable crosslinking occurs in the polymer as a result of the presence of trace amounts of a crosslinking agent. Examples of cross-linkers that the polymer portion is substantially free from include well known crosslinking agents include homo-multifunctional or hetero-multifunctional crosslinking agent as those described in "Bioconjugate Techniques, Second Edition by Greg T. Hermanson". The composition is also "substantially free" of multifunctional oligomers and polymers that could lead to formation of interpenetrated network or semi-interpenetrated network.

Coating Process

The polymer conjugated to the polypeptide may be coated onto a cell culture article in any suitable manner. Generally, an aqueous solution containing the polymer conjugated to the polypeptide, as described above, is disposed on a surface of the cell culture article. The aqueous solution may be sprayed onto the surface of the article, may be poured on the surface of the article, or the like. In some embodiments, the article is submerged and removed from the aqueous solution.

Once the aqueous solution is disposed on the surface of the article, the coated article is subjected to sufficient heat or electromagnetic radiation to attach the polymer conjugated to the polypeptide to the surface of the article. While it is possible to covalently attach the polymer to the surface of the article, the polymer will typically be attached to the article via non covalent interactions. Examples of non-covalent interactions that may attach the polymer with the substrate include chemical adsorption, hydrogen bonding, surface interpenetration, ionic bonding, van der Waals forces, hydrophobic interactions, dipole-dipole interactions, mechanical interlocking, and combinations thereof. Preferably, the polymer attaches to the surface of the article such that it does not delaminate or dissolve during cell culture conditions, such as in the presence of cell culture media at 37° C. In various embodiments, the coated article is subjected to a sufficient amount of heat or electromagnetic energy to attach the polymer to the surface of the cell culture article such that greater than 90% of the polymer-polypeptide remains attached to the surface after incubation in water for one week at 37° C. Preferably, greater than 95%, or greater than 99%, of the polymer-polypeptide remains attached.

Any suitable amount of heat or electromagnetic radiation may be used. For example, the cell culture article may be incubated at temperatures from room temperature to about 80° C. for a period of time from several minutes to several hours. For example, it has been found that coated cell culture articles incubated at 80° C. for 15 min or 37° C. for 6 hours showed good attachment of the polymer to the article surface. Alternatively, or in addition, the coated cell culture article may be exposed to electromagnetic energy, such as UV light. It has been found that coated articles illuminated with UV light under ambient atmosphere show good attachment. By way of example, a fusion lamp equipped with a "D" bulb at a dose of 20 to 30 J/cm$^2$ UVA at a temperature of about 40° C. to about 50° C. may be used. To avoid degradation of the polypeptide by highly energetic low wavelength radiation, a filter screening wavelengths below 300 nm may be placed between the light source and the coating composition. In the case of a polystyrene well plate, its lid or bottom plate can be advantageously used as an effective filter blocking the potentially deleterious low wavelength radiation.

Without intending to be bound to any particular theory, it is believed that the high percentage of polypeptide relative to the polymer aids in the surprising adsorption of the polymer on appropriate substrates from an aqueous solution and its non-solubility in water after adsorption. The high polypeptide content may lead to a high density of hydrogen bonding between polypeptides, inducing physical crosslinking or aggregation, which is a behaviour similar to natural occurring proteins. It is also well-known that some specific polypeptides are soluble in aqueous solution below their transition temperature, but they hydrophobically collapse and aggregate when the temperature is raised above the transition temperature. Such hydrophobic collapse may play a role in adsorption of polymers conjugated with polypeptides that are subjected to heating. In any case, it has been found that exposure to heat or electromagnetic radiation results in good polymer-polypeptide adsorption to the surface of cell culture articles.

The surface of the cell culture article to which the polymer conjugated to the polypeptide is coated may be formed of any suitable material. For example, the surface of the cell culture article may be formed from a ceramic substance, a glass, a plastic, a polymer or copolymer, any combinations thereof, or a coating of one material on another. Such base materials include glass materials such as soda-lime glass, pyrex glass, vycor glass, quartz glass; silicon; plastics or polymers, including dendritic polymers, such as poly(vinyl chloride), poly(vinyl alcohol), poly(methyl methacrylate), poly(vinyl acetate-co-maleic anhydride), poly(dimethylsiloxane) monomethacrylate, cyclic olefin polymers, fluorocarbon polymers, polystyrenes, polypropylene, polyethyleneimine; copolymers such as poly(vinyl acetate-co-maleic anhydride), poly(styrene-co-maleic anhydride), poly(ethylene-co-acrylic acid) or derivatives of these or the like.

It has been found that good attachment of the polymer-polypeptide to the surface of the cell culture article is achieved when the substrate exhibits a water contact angle (sessile drop measurement) between 12° and 85°. Preferably the contact angle of the substrate is between 25° and 70°, such as between 30° and 60°. It will be understood that substrates may be treated so that they exhibit an appropriate contact angle. For example, the substrate may be corona treated or plasma treated. Examples of vacuum or atmospheric pressure plasma include RF and microwave plasmas both primary and secondary, dielectric barrier discharge, and corona discharge generated in molecular or mixed gases including air, oxygen, nitrogen, argon, carbon dioxide, nitrous oxide, or water vapor. By way of example, plasma treated polystyrene, such as TCT polystyrene or CellBIND® treated polystyrene provide good substrates for polymer-polypeptide attachment. Naturally occurring animal-derived biological adhesive proteins also exhibit good binding to such surfaces. Accordingly, surfaces to which naturally occurring proteins readily attach may also provide good substrates for polymer-polypeptide attachment.

Cell Culture Article

A polymer conjugated to a polypeptide as described herein may be attached to the surface of any suitable cell culture article, such as single and multi-well plates, such as 6, 12, 96, 384, and 1536 well plates, jars, petri dishes, flasks, beakers, plates, roller bottles, slides, such as chambered and multichambered culture slides, tubes, cover slips, bags, membranes, hollow fibers, beads and microcarriers, cups, spinner bottles, perfusion chambers, bioreactors, CellSTACK® and fermenters.

Figure 3A:
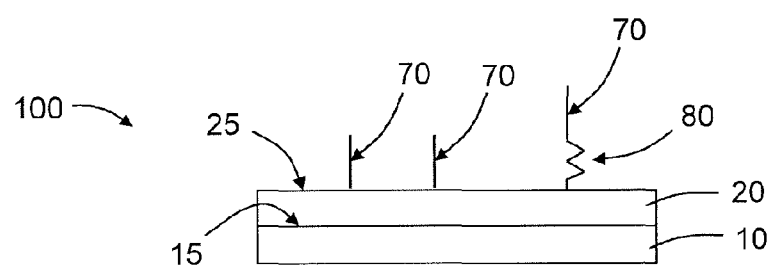
FIGS. 3A-B are schematic diagrams of side views of coated articles.

Referring to FIG. 3A, a schematic diagram of a side view of an article 100 for culturing cells is shown. The article 100 includes a base material substrate 10 having a surface 15. A polymer 20 conjugated to a polypeptide 70 is disposed on the surface 15 of the base material 10. As depicted, the polypeptide 70 may be conjugated or covalently bound to the polymer 20 directly or indirectly via linker 80 as described above. While not shown, it will be understood that the polymer 20 conjugated to the polypeptide 70 may be disposed on a portion of base material 10. The base material 10 may be any material suitable for culturing cells, such as those described above.

Figure 3B:
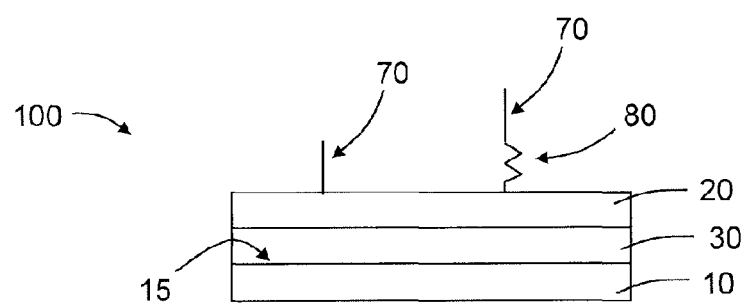

As shown in FIG. 3B, an intermediate layer 30 may be disposed between surface 15 of base material 10 and the coated polymer 20 conjugated to the polypeptide 70. Intermediate layer 30 may be configured to improve binding of the coated polymer 20 conjugated to the polypeptide 70 to the substrate 10, to facilitate spreading of the aqueous solution containing the polymer conjugated to the polypeptide, to render portions of the surface 10 that are uncoated cytophobic to encourage cell growth on coated areas, to provide topographical features if desired through, for example, patterned printing, or the like. For example, if substrate 10 is a glass substrate, it may be desirable to treat a surface of the glass substrate with an epoxy coating or a silane coating. For various polymer base materials 10 it may be desirable to provide an intermediate layer 30 of polyamide, polyimide, polypropylene, polyethylene, or polyacrylate. While not shown, it will be understood that the coated polymer 20 conjugated to the polypeptide 70 may be disposed on a portion of intermediate layer 30. It will be further understood that intermediate layer 30 may be disposed on a portion of base material 10.

Figure 4A:
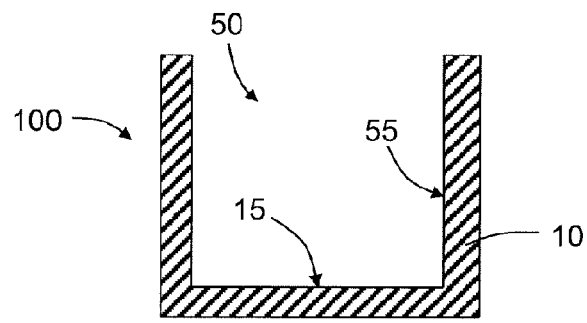
FIGS. 4A-C are schematic diagrams of cross sections of cell culture articles having a well. Uncoated (4A); coated surface (4B); and coated surface and side walls (4C).

Article 100, in numerous embodiments, is cell culture ware having a well, such as a Petri dish, a multi-well plate, a flask, a beaker or other container having a well. Referring now to FIG. 4A, article 100 formed from base material 10 may include one or more wells 50. Well 50 includes a sidewall 55 and a surface 15.

Figure 4B:
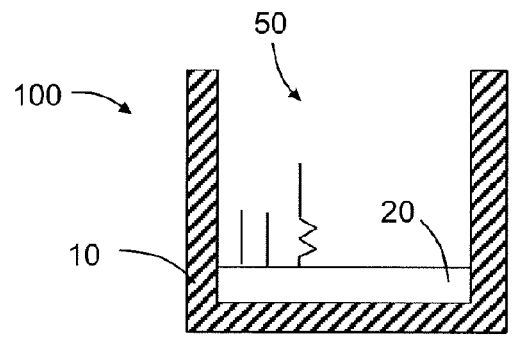
Figure 4C:
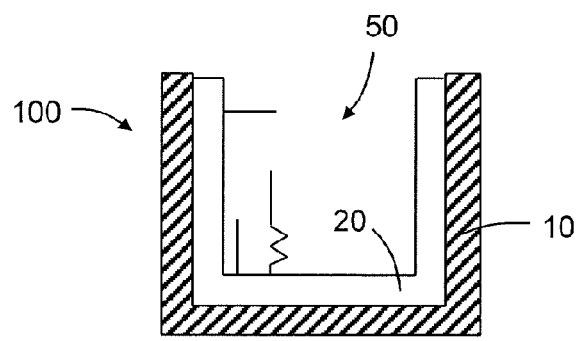

Referring to FIG. 4B-C, a polymer 20 conjugated to a polypeptide 70 may be disposed on surface 15 or sidewalls 55 (or, as discussed above with regard to FIG. 1 one or more intermediate layer 30 may be disposed between surface 15 or sidewall 55 and coated polymer 20 conjugated to the polypeptide 70) or a portion thereof. As shown in FIG. 4C, sidewalls 55 may be coated with polymer 20 conjugated to polypeptide 70.

In various embodiments, surface 15 of base material 10 is treated, either physically or chemically, to impart a desirable property or characteristic to the surface 15. For example, and as discussed above, surface 15 may be corona treated or plasma treated.

The coated polymer 20 conjugated to the polypeptide 70, whether disposed on an intermediate layer 30 or base material 10, preferably uniformly coats the underlying substrate. By "uniformly coated", it is meant that the layer 20 in a given area, for example a surface of a well of a culture plate, completely coats the area at a thickness of about 5 nm or greater. While the thickness of a uniformly coated surface may vary across the surface, there are no areas of the uniformly coated surfaces through which the underlying layer (either intermediate layer 30 or base material 10) is exposed. Cell responses across non-uniform surfaces tend to be more variable than cell responses across uniform surfaces.

In various embodiments, article 100 includes a uniformly coated layer 20 having a surface 25 with an area greater than about 5 mm$^2$. When the area of the surface 15 is too small, reliable cell responses may not be readily observable because some cells, such as human embryonic stem cells, are seeded as colonies or clusters of cells (e.g., having a diameter of about 0.5 mm) and adequate surface is desirable to ensure attachment of sufficient numbers of colonies to produce a quantitative cell response. In numerous embodiments, an article 100 has a well 50 having a uniformly coated surface 15, where the surface 15 has an area greater than about 0.1 cm$^2$, greater than about 0.3 cm$^2$, greater than about 0.9 cm$^2$, or greater than about 1 cm$^2$.

Incubating Cells on Synthetic Polymer Containing Conjugated Polypeptide

A cell culture article having a polymer containing a conjugated polypeptide as described above may be seeded with cells. The cells may be of any cell type. For example, the cells may be connective tissue cells such as epithelial and endothelial cells, hepatocytes, skeletal or smooth muscle cells, heart muscle cells, intestinal cells, kidney cells, or cells from other organs, stem cells, islet cells, blood vessel cells, lymphocytes, cancer cells, or the like. The cells may be mammalian cells, preferably human cells, but may also be non-mammalian cells such as bacterial, yeast, or plant cells.

In numerous embodiments, the cells are stem cells which, as generally understood in the art, refer to cells that have the ability to continuously divide (self-renewal) and that are capable of differentiating into a diverse range of specialized cells. In some embodiments, the stem cells are multipotent, totipotent, or pluripotent stem cells that are isolated from an organ or tissue of a subject. Such cells are capable of giving rise to a fully differentiated or mature cell types. A stem cell may be a bone marrow-derived stem cell, autologous or otherwise, a neuronal stem cell, or an embryonic stem cell. A stem cell may be nestin positive. A stem cell may be a hematopoeietic stem cell. A stem cell may be a multi-lineage cell derived from epithelial and adipose tissues, umbilical cord blood, liver, brain or other organ. In various embodiments, the stem cells are undifferentiated stem cells, such as undifferentiated embryonic stem cells.

Prior to seeding cells, the cells may be harvested and suspended in a suitable medium, such as a growth medium in which the cells are to be cultured once seeded onto the surface. For example, the cells may be suspended in and cultured in a serum-containing medium, a conditioned medium, or a chemically-defined medium. As used herein, "chemically-defined medium" means cell culture media that contains no components of unknown composition. Chemically defined media may, in various embodiments, contain no proteins, hydrolysates, or peptides of unknown composition. In some embodiments, conditioned media contains polypeptides or proteins of known composition, such as recombinant growth hormones. Because all components of chemically-defined media have a known chemical structure, variability in culture conditions and thus cell response can be reduced, increasing reproducibility. In addition, the possibility of contamination is reduced. Further, the ability to scale up is made easier due, at least in part, to the factors discussed above. Chemically defined cell culture media are commercially available from Invitrogen (Invitrogen Corporation, 1600 Faraday Avenue, PO Box 6482, Carlsbad, Calif. 92008) as STEM PRO, a fully serum- and feeder-free (SFM) specially formulated from the growth and expansion of embryonic stem cells, and Stem Cell Technologies, Inc. as mTeSR™1 maintenance media for human embryonic stem cells. Another chemically-defined medium is MesenCult®-XF Medium which is a standardized, xeno-free, serum-free medium for the culture of human mesenchymal stem cells (MSCs). MesenCult®-XF Medium is available from STEMCELL Technologies Inc.

One or more growth or other factors may be added to the medium in which cells are incubated with the synthetic hydrogel layer. The factors may facilitate cellular proliferation, adhesion, self-renewal, differentiation, or the like. Examples of factors that may be added to or included in the medium include muscle morphogenic factor (MMP), vascular endothelium growth factor (VEGF), interleukins, nerve growth factor (NGF), erythropoietin, platelet derived growth factor (PDGF), epidermal growth factor (EGF), activin A (ACT), hematopoietic growth factors, retinoic acid (RA), interferons, fibroblastic growth factors, such as basic fibroblast growth factor (bFGF), bone morphogenetic protein (BMP), peptide growth factors, heparin binding growth factor (HBGF), hepatocyte growth factor, tumor necrosis factors, insulin-like growth factors (IGF) I and II, transforming growth factors, such as transforming growth factor-β1 (TGFβ1), and colony stimulating factors.

The cells may be seeded at any suitable concentration. Typically, the cells are seeded at about 10,000 cells/cm$^2$ of substrate to about 500,000 cells/cm$^2$. For example, cells may be seeded at about 50,000 cells/cm$^2$ of substrate to about 150,000 cells/cm$^2$. However, higher and lower concentrations may readily be used. The incubation time and conditions, such as temperature, $CO_2$ and $O_2$ levels, growth medium, and the like, will depend on the nature of the cells being cultured and can be readily modified. The amount of time that the cells are incubated on the surface may vary depending on the cell response desired.

The cultured cells may be used for any suitable purpose, including (i) obtaining sufficient amounts of undifferentiated stem cells cultured on a synthetic surface in a chemically defined medium for use in investigational studies or for developing therapeutic uses, (ii) for investigational studies of the cells in culture, (iii) for developing therapeutic uses, and (iv) for therapeutic purposes.

Overview of Aspects of Disclosure

In a first aspect, a method for coating a surface of a cell culture article includes dissolving a polymer having a covalently attached polypeptide in an aqueous solution to produce a polymer solution. The polymer is formed from monomers selected to form a polymer having a linear backbone. The polymer is free of crosslinks. The weight percentage of the polypeptide relative to the polymer conjugated to the polypeptide is sufficiently high to render the polymer conjugated to the polypeptide water soluble. The aqueous solution is substantially free of organic solvents. The method further includes (i) disposing the polymer solution on the surface of the cell culture article to produce a coated article; and (ii) subjecting the coated article to sufficient heat or electromagnetic radiation to attach the polymer conjugated to a polypeptide to the surface of the cell culture article.

A second aspect is a method of the first aspect, wherein a substantially similar polymer that it not conjugated to the polypeptide is insoluble in water at 25° C.

A third aspect is a method of the first or second aspect, wherein the weight percentage of the polypeptide relative to the polymer conjugated to the polypeptide is greater than 40%.

A fourth aspect is a method of the first or second aspect, wherein the weight percentage of the polypeptide relative to the polymer conjugated to the polypeptide is greater than 60%.

A fifth aspect is a method of any of the first four aspects, wherein the polypeptide is a cell adhesive polypeptide.

A sixth aspect is a method of any of the first four aspects, wherein the polypeptide comprises an RGD sequence.

A seventh aspect is a method of any of the first four aspects, wherein the polypeptide is a selected from the group of a vitronectin polypeptide, a collagen polypeptide, of a laminin polypeptide, a bone sialoprotein polypeptide, and a fibronectin polypeptide.

An eighth aspect is a method of any of the first four aspects, wherein the polypeptide is a vitronectin polypeptide.

A ninth aspect is a method according to any of the preceding aspects, wherein the polymer is formed from at least one monomer comprising a conjugated polypeptide.

A tenth aspect is a method of the ninth aspect, wherein the at least one monomer comprising a conjugated polypeptide is methacrylic acid.

An eleventh aspect is a method of any of the preceding aspects, wherein the polymer is formed from polymerization of (i) methacrylic acid conjugated to the polypeptide and (ii) hydroxyethylmethacrylate.

A twelfth aspect is a method of any of the first ten aspects, wherein the polymer is formed from polymerization of a (i) monomer comprising a methacrylic acid functional group and (ii) hydroxyethylmethacrylate.

A thirteenth aspect is a method of any of the preceding aspects, wherein the polymer conjugated to the polypeptide has a molecular weight of between 10 kilodaltons and 1000 kilodaltons.

A fourteenth aspect is a method of any of the preceding aspects, wherein the polymer solution comprises between 0.1 mg/ml and 0.5 mg/ml of the polymer conjugated to the polypeptide.

A fifteenth aspect is a method of any of the preceding aspects, wherein the polymer solution comprises between 0.2 mg/ml and 0.3 mg/ml of the polymer conjugated to the polypeptide.

A sixteenth aspect is a method of any of the preceding aspects, wherein subjecting the coated article to sufficient heat or electromagnetic radiation comprises incubating the coated article at a temperature of 37° C. or greater.

A seventeenth aspect is a method of any of the preceding aspects, wherein subjecting the coated article to sufficient heat or electromagnetic radiation comprises incubating the coated article at a temperature of 60° C. or greater.

A eighteenth aspect is a method of any of the preceding aspects, wherein subjecting the coated article to sufficient heat or electromagnetic radiation comprises subjecting the coated article to UV radiation.

A nineteenth aspect is a method of any of the preceding aspects, wherein the surface of the substrate has a water contact angle between 12° and 85°.

A twentieth aspect is a method of any of the preceding aspects, wherein the surface of the substrate has a water contact angle between 25° and 70°.

A twenty-first aspect is a method of any of the preceding aspects, wherein the surface of the substrate has a water contact angle between 30° and 60°.

A twenty-second aspect is a method of any of the preceding aspects, wherein the surface of the substrate is a plasma treated polystyrene surface.

A twenty-third aspect is a cell culture article produced according to a method of any of the preceding aspects.

A twenty-fourth aspect is a composition comprising an aqueous solution and a polymer conjugated to a polypeptide dissolved in the aqueous solution. The polymer is formed from monomers selected to form a polymer having a linear backbone. The polymer is free of crosslinks. A substantially similar polymer that it not conjugated to the polypeptide is insoluble in water at 37° C. The weight percentage of the polypeptide relative to the polymer conjugated to the polypeptide is sufficiently high to render the polymer conjugated to the polypeptide water soluble. The composition is substantially free of organic solvents.

A twenty-fifth aspect is a composition of the twenty-fourth aspect, wherein the polymer is formed from polymerization of (i) methacrylic acid conjugated to the polypeptide and (ii) hydroxyethylmethacrylate.

In the following, non-limiting examples are presented, which describe various embodiments of the articles and methods discussed above.

EXAMPLES

Example 1: Preparation of (MAA-PEG4-VN)

Methacrylic acid-(polyethylene glycol)$_4$-vitronectin (MMA-PEG4-VN) was provided by American Peptide, Sunnyvale, Calif. and was synthesized as follows. The VN polypeptide sequence was KGGPQVTRGDVFTMP (SEQ ID NO:1).

Briefly, the polypeptide-monomer was synthesized on 1 mmol Fmoc-Rink Amide resin via Fmoc chemistry. Protecting groups used for amino acids are: t-Butyl group for and Asp and Thr, Trt group for Gln, Pbf for Arg, Boc for Lys. Fmoc protected amino acids were purchased from EMD Biosciences; Fmoc-PEG4-OH was purchased from Quanta Biodesign. Reagents for coupling and cleavage were purchased from Aldrich. Solvents were purchased from Fisher Scientific. The peptide chain was assembled on resin by repetitive removal of the Fmoc protecting group and coupling of protected amino acid. HBTU and HOBt were used as coupling reagents and NMM was used as base. 20% piperidine in DMF was used as de-Fmoc-reagent. Methacrylic acid (MAA) was coupled to the amino group of PEG4 after removal of the Fmoc protecting group. After the last coupling, the resin was treated with TFA/TIS/H2O (95:3:2, v/v/v) for cleavage and removal of the side chain protecting groups. Crude polypeptide-monomer was precipitated from cold ether and collected by filtration. Crude polypeptide-monomer was purified by reverse-phase HPLC. Collected fractions with purity over 90% were pooled and lyophilized. The yield of the final product was 1.035 g (purification yield 25.9%). The products were provided by American Peptide in ≥90% purity and were used without further purification.

Example 2: Preparation of Functionalized Cell Adhesive Polymer

Hydroxyethyl methacrylate (HEMA), 60 mg (0.46 mmol), and MAA-PEO4-VN, 100 mg (0.05 mmol) were added to 7.5 ml ethanol in an amber flask equipped with a stir bar. Then 2, 2'-Azobis-(2-Methylbutyronitrile), 9 mg, was added and stirred until completed dissolution. The solution was deoxygenated with an argon purge for 1 minute. The sealed flask was then heated for 24 hours at 68° C. under mixing and protected from light. After cooling to room temperature, the poly(HEMA-co-MAA-PEO4-VN) polymer was isolated by pouring the crude reaction medium in ethylacetate. The white solid obtained was washed three times with diisopropyl ether and freeze dried.

The molecular weight of the poly(HEMA-co-MAA-PEO4-VN) polymer was determined by size exclusion chromatography (SEC) coupled with a refractive Index detector, a light scattering detector, a photodiode array detector and a viscometer detector. The mobile phase was trifluoroethanol+ potassium trifluoroacetate. Average Mw was 80,000 to 100,000 and Mn was 25,000 to 33,000 and PDI was 2.8.

Although used herein without any purification, unreacted monomers or monomer-peptides can be easily removed from the poly(HEMA-co-MAA-PEO4-VN) polymer by means of well known processes such as a continuous or discontinuous diafiltration process. Particularly efficient unreacted peptide removal can be performed using for example a 5,000 MWCO Corning Spin-X concentrator column.

The resulting polymer, with or without purification, can be stored at 4° C. for several months.

Homopolymer of MAA-PEO4-VN can be prepared following the same protocol except HEMA monomer is omitted.

Example 3: Preparation of Coating Composition

Coating compositions were prepared by dissolving 2.5 mg of poly(HEMA-co-MAA-PEO4-VN) polymer in 10 ml deionized (DI) water. The solution can be stored at 4° C. before use.

Example 4: Preparation of Coated Cell Culture Ware

800 µl of coating composition was dispensed in each well of 6 well plates for ultra-low attachment (ULA) treated, tissue culture treated (TCT) treated and CellBIND® treated polystyrene (PS) plates. In the case of non-treated polystyrene plates, 2 ml of the coating composition was dispensed in each well of 6 well plates. The plates were then placed either into a 37° C. incubator for 6 hours, or into a 80° C. oven for 15 min or exposed to 30 J/cm² UV light dose provided by a Fusion "D" bulb. The excess coating composition was then aspirated. The plates were washed for 1 hour with 1% sodium dodecyl sulfate (SDS) aqueous solution followed by rinsing with DI water and dried with a dry air flow. The plates were ready for sanitization or sterilization.

T-flask and CellStack™ parts were coated using the same protocol except that 6 ml and 40 ml coating composition were dispensed into each T-flask and CellStack™ respectively.

Immobilized peptide density was determined by a bicinchoninic acid (BCA) assay using a BCA protein quantification kit from Uptima. Standards were prepared using VN peptide (KGGPQVTRGDVFTMP, SEQ ID NO:1) in PBS. Absorbance was read on a Biotek® Synergy 4.

Coating homogeneity assessment and quantification of the peptide polymer immobilized was done by colloidal gold staining using Colloidal Gold Total Protein Stain reagent available from Bio-Rad Laboratories (catalog 170-6527) absorbance was read at 565 nm on a Biotek Synergy 4.

Figure 5:
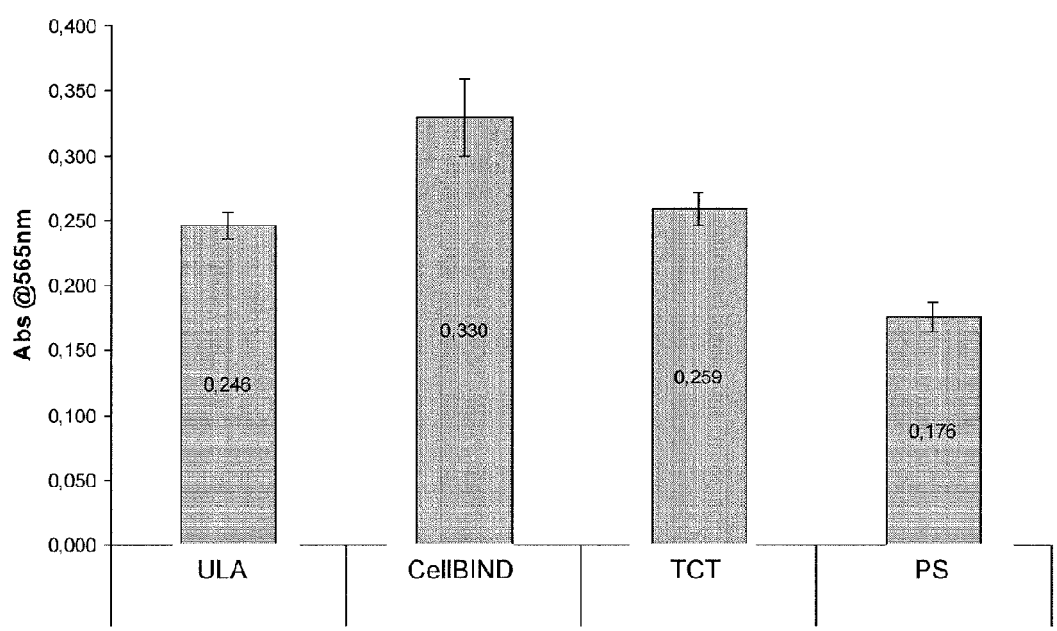
FIG. 5 is a bar graph showing the amount of immobilized copolymer on different substrates measured by colloidal gold total protein staining.

FIG. 5 shows the amount of immobilized copolymer on different substrates measured by colloidal gold total protein staining. Tested substrates include non-treated polystyrene (PS), TCT-treated, CellBIND®-treated and ULA-treated 6 well polystyrene plates. A higher amount of the poly (HEMA-co-MAA-PEO4-VN) polymer was immobilized on TCT and Cellbind® plates.

Figure 6:
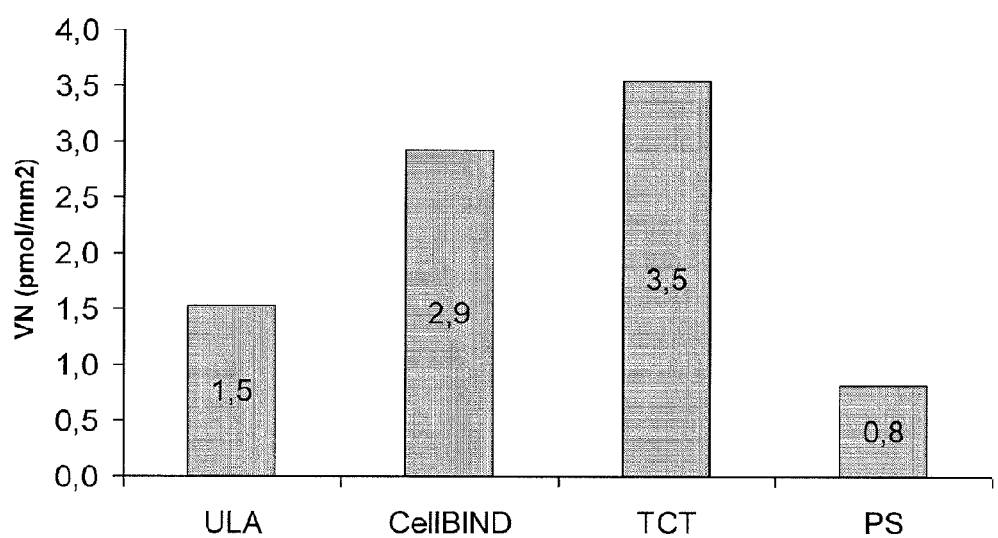
FIG. 6 is a bar graph showing amount of immobilized peptide (pmol/mm$^2$) quantified by BCA, for non-treated, TCT treated, CellBIND® treated and ULA treated 6 well polystyrene plates coated in accordance to the teachings presented herein.

FIG. 6 shows the results from the BCA assay. In FIG. 6 absorbance at 562 nM, which correlates to the amount of immobilized peptide (pmol/mm²), is shown for non-treated (PS), TCT treated, CellBIND® treated and ULA treated 6 well polystyrene plates. The quantification reproduces the results of the colloidal gold assay shown in FIG. 5: a higher amount of the poly(HEMA-co-MAA-PEO4-VN) polymer was immobilized on TCT and Cellbind® plates.

Figure 7:
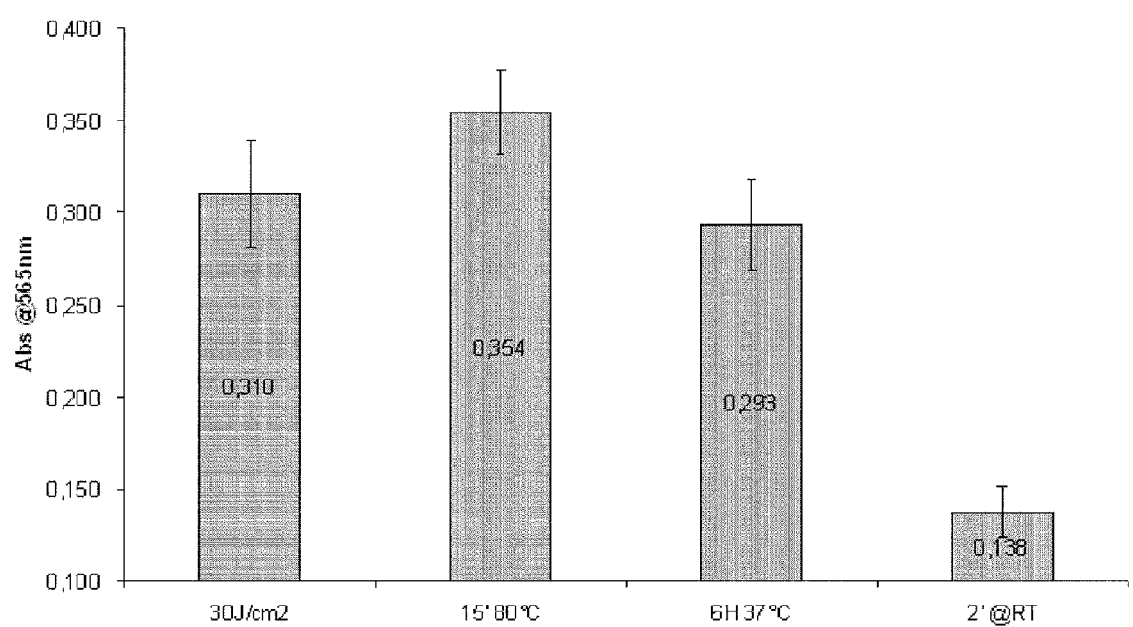
FIG. 7 is a bar graph showing the amount of immobilized copolymer on TCT substrate using different methods to immobilize the polymer such as UV light exposure, and heating at 80° C. or 37° C. for 15 min or 6 hours, respectively.

FIG. 7 shows the amount of immobilized copolymer on TCT substrate using different methods to immobilize the polymer such as UV light exposure (30 J/cm²), and heating at 80° C. for 15 minutes, 37° C. for 6 hours, or no heating (2 minutes at room temperature). The amount of immobilized copolymer was determined by colloidal gold total protein staining. The results presented in FIG. 7 show that a higher amount of polypeptide-polymer was immobilized on substrates exposed to heat or UV light, with a much lower amount when the thermal or UV treatment was omitted.

Figure 8:
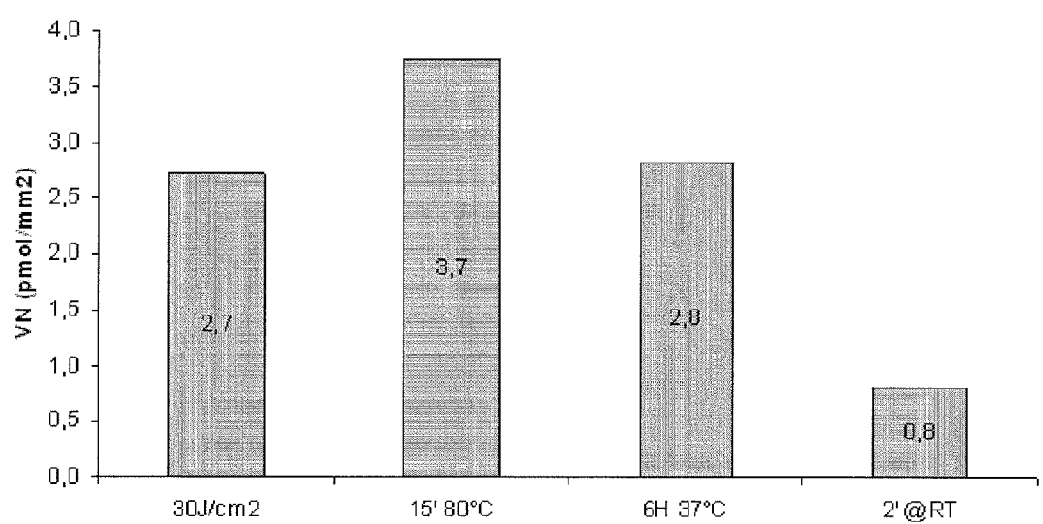
FIG. 8 is a bar graph showing the amount of immobilized peptide (pmol/mm$^2$) for TCT treated 6 well polystyrene plates coated in accordance with the teachings provided herein and incubated at 37° C. for 6 hours, 80° C. for 15 min or exposed to 30 J/cm$^2$ UV-A at 40-50° C.

FIG. 8 shows the amount of immobilized peptide (pmol/mm²) according to a BCA assay for TCT treated 6 well polystyrene plates coated as described above and incubated at 37° C. for 6 hours, 80° C. for 15 min or exposed to 30 J/cm² UV-A at 40-50° C., or no treatment (2 minutes at room temperature). The results presented in FIG. 8 show that a higher amount of polypeptide-polymer was immobilized on substrates exposed to heat or UV light, with a much lower amount when the thermal or UV treatment was omitted, and that heating or UV treatment produces similar results.

Figure 9A:
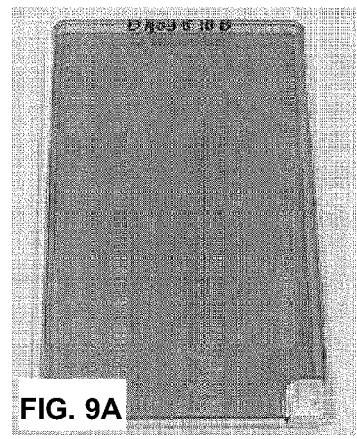
FIGS. 9A-C are photographs showing colloidal gold staining (Colloidal Gold Total Protein Stain reagent available from Bio-Rad, Hercules, Calif.) of a T-75 flask (FIG. 9A), CellStack layer (FIG. 9B) and 6 well plate (FIG. 9C) coated in accordance with the teachings presented herein.
Figure 9B:
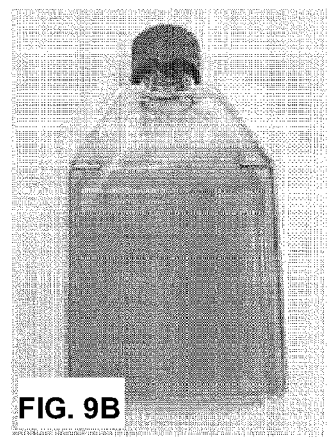
Figure 9C:
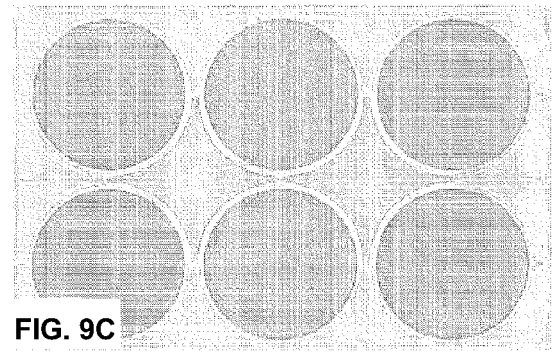
Figure 10:
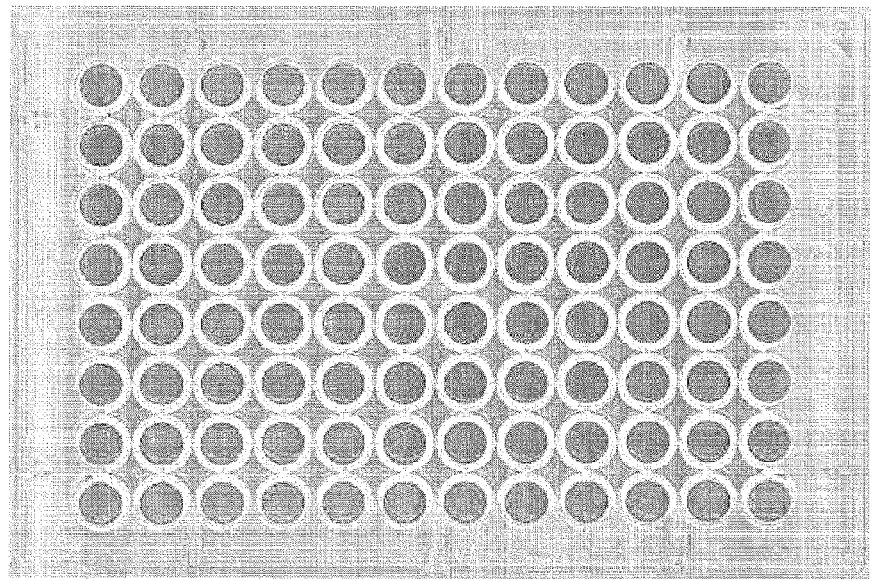
FIG. 10 is a photograph showing colloidal gold staining of a 96 well plate coated in accordance with the teachings presented herein.

FIGS. 9A-C are photographs showing colloidal gold staining (Colloidal Gold Total Protein Stain reagent available from Bio-Rad, Hercules, Calif.) of a T-75 flask (FIG. 9A), CellStack layer (FIG. 9B) and 6 well plate (FIG. 9C) coated as described above. FIG. 10 is a photograph showing colloidal gold staining of a 96 well plate coated as described herein. The photographs of FIGS. 9-10 show that coatings described herein can be effectively applied to a variety of cell culture ware. In addition the photographs illustrate the high homogeneity of coating in small volume vessels (FIG. 10) and vessels with varying shapes (FIGS. 9A-C).

Figure 11:
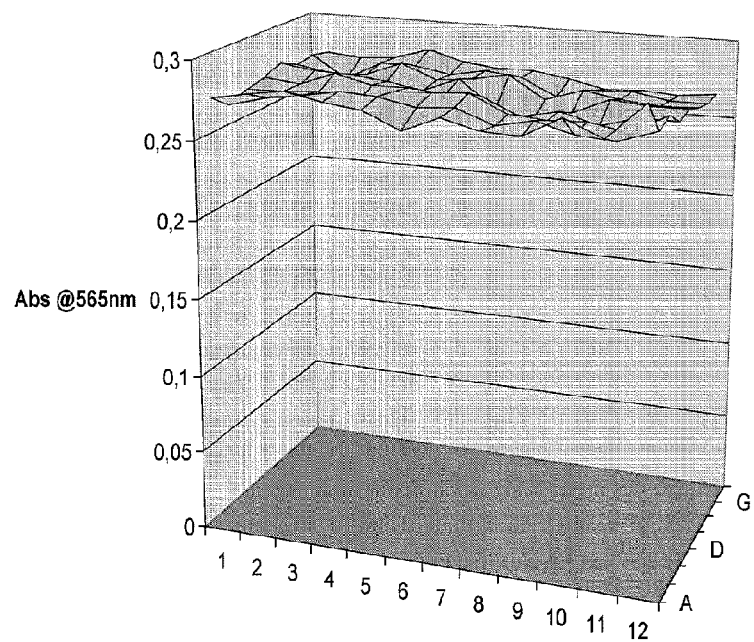
FIG. 11 is a graph showing the quantification of the colloidal gold staining of the 96 well plate from FIG. 10.

FIG. 11 is a graph showing the quantification of the colloidal gold staining of the 96 wellplate from FIG. 11. Optical density was measured at 565 nm. These data confirm the exceptionally good homogeneity of the coating.

Example 5: Culture of Human Embryonic Stem Cells: BG01v hESC

1×10⁶ BG01v human embryonic stem cells (hESC), Passage 35, were seeded in each of three wells of a six well plate and incubated at 37° C. One plate contained wells coated as described above, and another plate was coated with Matrigel™ Coating: BD Matrigel™ Lot #A5628 (BD bioscience cat #356231) in accordance with the manufacturer's instructions. The plates were sanitized by incubating with ethanol 70% v/v in water before seeding. The cells were cultured in a chemically defined medium: mTeSR1® Media (StemCell Technologies cat #05850), 4 ml per well, 1× feed (day 2).

Cells were harvested from 2 wells at day 3 and counted. 9.09×10⁶ cells were collected from the plate coated as described above and 9.59×10⁶ cells were collected from the Matrigel™ coated plate. The fold expansion was 4.54 and 4.79 for the polymer-polypeptide coated surface described above and Matrigel™, respectively. In both cases cell harvesting was easily performed in less than 5 minutes by enzymatic Digestion using 0.05% Trypsin-EDTA Solution (Gibco/Invitrogen, cat #25300).

Figure 12A:
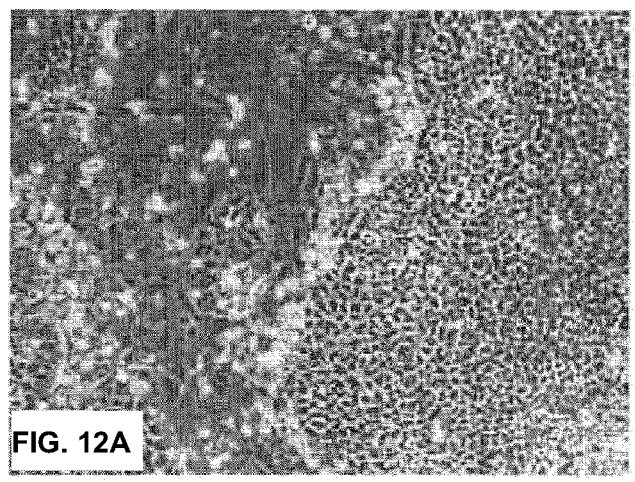
FIGS. 12A-B are micrographs showing BG01v hESC colonies formed 3 days after seeding (in mTeSR1®) on Matrigel™ coated 6 wellplate (FIG. 12A) and on a plate coated with the coating according to an embodiment described herein (FIG. 12B).
Figure 12B:
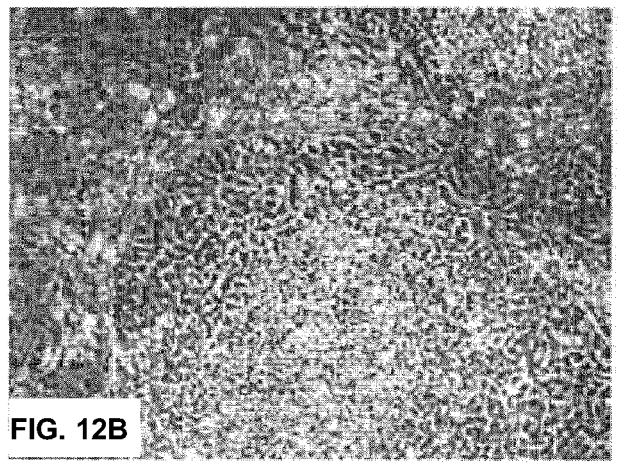
Figure 15A:
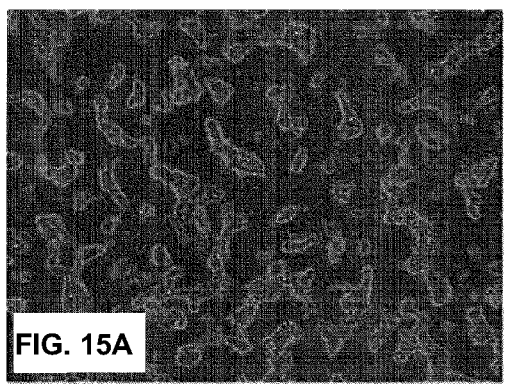
FIGS. 15A-D are photomicrographs of ESD3 mESC colonies formed after 1 day from single cell seeding on non-treated polystyrene (FIG. 15D), TCT treated polystyrene (FIG. 15A), CellBIND® treated polystyrene (FIG. 15B) and ULA treated polystyrene (FIG. 15C) plates coated in accordance with the teachings presented herein.
Figure 15B:
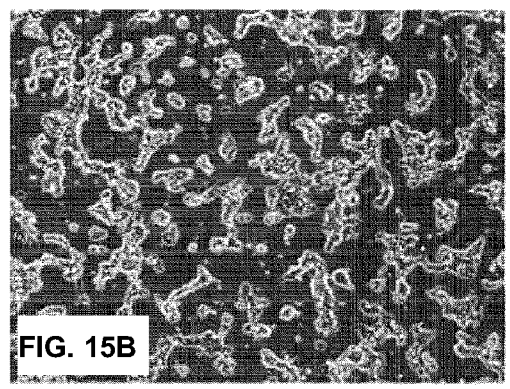
Figure 15C:
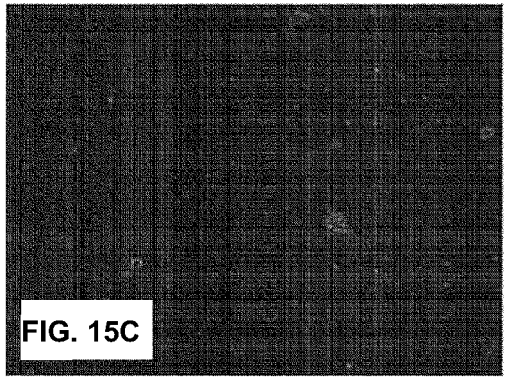
Figure 15D:
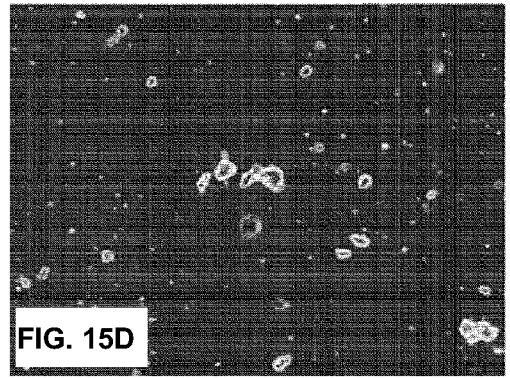

FIG. 12 shows BG01v hESC colonies 3 days after seeding on the Matrigel™ coated plate (FIG. 12A) and on the polymer-polypeptide coated plate prepared as described herein (FIG. 12B). The polymer-polypeptide coated plates were prepared by dispensing 600 µl of 0.25 mg/ml peptide-copolymer aqueous solution and were sanitized with 70% ethanol for one hour prior to seeding. Polymer immobilization was performed by exposing the plate to 30 J/cm² UV-A at 40-50° C. The colonies have similar morphologies on both the synthetic polymer-polypeptide surface and the Matrigel™ biological coating. This experiment illustrates that synthetic coatings as described herein can enable hESC culture comparable to Matrigel™ in chemically defined media and that the synthetic polymer-polypeptide coatings described herein can survive ethanol sanitization. synthetic polymer-polypeptide coatings described herein can survive ethanol sanitization.

Example 6: Culture of Bone Marrow-Derived hMSC 70,000 bone marrow-derived human mesenchymal stem cells (hMSC) (StemCell Technologies cat #MSC-001F), Passage 4, were seeded into each well of a six well plate and incubated at 37° C. One plate contained wells coated with a polymer-polypeptide as described above (UV, 30 J/cm²), another plate was coated with MesenCult®-XF Attachment Substrate (StemCell Technologies cat #05424-1:28 dilution in 1×DPBS) in accordance with the manufacturer's instructions, and another plate was coated with Corning's Synthemax™ synthetic substrate. The cells were cultured in a chemically defined medium: MesenCult®-XF Medium (StemCell Technologies cat #05420), 3 ml per well, Feed 1× (day 2). Cells were harvested at day 4 by enzymatic digestion with 0.05% trypsin-EDTA solution (Gibco/Invitrogen, cat #25300) and were counted.

FIG. 13 shows that cell viability and fold expansion are comparable to those achieved with MesenCult® attachment substrate biological coating and Synthemax™ synthetic coating. This experiment showed that hMSC can be cultured on the synthetic polymer-polypeptide substrate described herein in Xeno-free media with acceptable cell viability and cell expansion. These data also show that viability is comparable to the biological MesenCult attachment substrate while fold expansion slightly lower but comparable to Synthemax™, which is believed to be the best synthetic surface available.

The photomicrographs on FIG. 14 show morphology of bone marrow-derived hMSC, 2 and 4 days after seeding on the polymer-polypeptide coating described above (FIG. 14A and FIG. 14B) and MesenCult® attachment substrate biological coating (FIG. 14C and FIG. 14D). On both substrates, cells morphology looks very similar.

Example 7: Culture of Mouse Embryonic Stem Cells

ES-D3 cells (ATCC #CRL-11632) were grown in Dulbecco's Modified Eagle Medium, Life Technologies Carlsbad, Calif., medium supplemented with 15% FBS and 0.1 mM beta-mercaptoethanol as recommended per ATCC, Carlsbad, Calif. Cells were trypsinized and diluted before they reach confluence. Then they were counted, washed in D-PBS and resuspended in mTeSR1 synthetic medium (Stem Cell Technologies, Vancouver, BC, CA). 7×10⁵ cells per well were then seeded as single cells in 6 well plate format in 2 ml mTeSR1 and incubated at 37° C.

FIGS. 15A-D are photomicrographs of ESD3 mESC colonies formed after 1 day from single cell seeding on non-treated polystyrene (FIG. 15D), TCT treated polystyrene (FIG. 15A), CellBIND® treated polystyrene (FIG. 15B) and ULA treated (FIG. 15C) polystyrene plates coated in accordance with the teachings presented herein. A greater number of colonies formed on the TCT and CellBIND® treated polystyrene coated plates than on the ULA and non-treated polystyrene coated plates, which is in good agreement with the amount of immobilized peptide determined by BCA (FIG. 6).

Figure 16A:
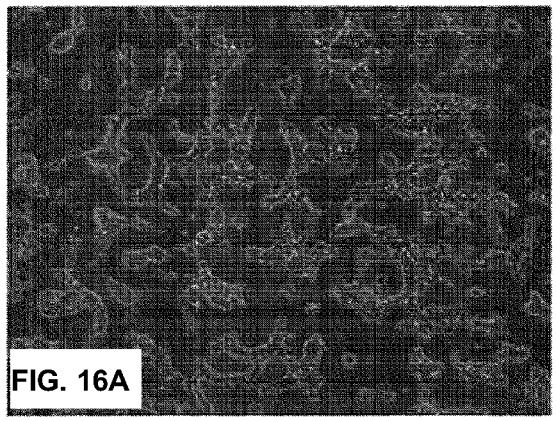
FIGS. 16A-B are photomicrographs showing morphology of ESD3 mESC colonies formed after 1 day from single cell seeding.
Figure 16B:
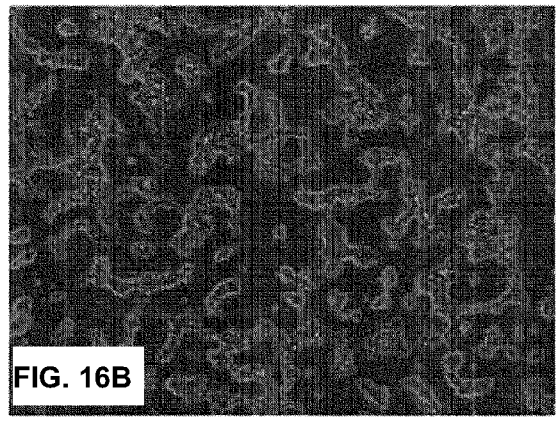

FIG. 16 shows that single cell seeding leads to nice mESC colonies formed after 1 day culture and also those synthetic polymer-polypeptide coatings as described herein and that the coatings survive ethanol sanitization FIG. 16A shows cells that were seeded on coatings that were not ethanol sterilized. FIG. 16B shows cells that were seeded on coatings that were ethanol sterilized (1 hour sanitization with 70% ethanol). FIG. 16 shows that colonies look similar on both non-sanitized and sanitized coating demonstrating that the coating resists ethanol sanitization. Plates were prepared by dispensing 700 µl of 0.25 mg/ml aqueous solution of the peptide-copolymer. Polymer immobilization was performed by incubating the plate at 80° C. for 15 min.

Thus, embodiments of SYNTHETIC COATING FOR CELL CULTURE are disclosed. One skilled in the art will appreciate that the coatings, articles, compositions and methods described herein can be practiced with embodiments other than those disclosed. The disclosed embodiments are presented for purposes of illustration and not limitation.

What is claimed is:

1. An aqueous solution, comprising:
   a polymer conjugated to a polypeptide formed from polymerization of (i) methacrylic acid conjugated to the polypeptide and (ii) hydroxyethylmethacrylate,
   wherein the polymer has a linear backbone,
   wherein the polymer is crosslink free,
   wherein the weight percentage of the polypeptide relative to the polymer conjugated to the polypeptide is sufficiently high to render the polymer conjugated to the polypeptide water soluble at 25° C.,
   wherein the polypeptide comprises an RGD sequence, and
   wherein the polypeptide is selected from the group of a vitronectin polypeptide, a collagen polypeptide, a laminin polypeptide, a bone sialoprotein polypeptide, and a fibronectin polypeptide.

2. The aqueous solution of claim 1, wherein were the polymer not conjugated to the polypeptide, the polymer would be insoluble in water at 37° C.

3. The aqueous solution of claim 1, wherein the weight percentage of the polypeptide relative to the polymer conjugated to the polypeptide is greater than 40%.

4. The aqueous solution of claim 1, wherein the weight percentage of the polypeptide relative to the polymer conjugated to the polypeptide is greater than 60%.

5. The aqueous solution of claim 1, wherein the polypeptide is a cell adhesive polypeptide.

6. The aqueous solution of claim 1, wherein the polypeptide is a vitronectin polypeptide.

7. The aqueous solution of claim 1, wherein the polymer conjugated to the polypeptide has a molecular weight of between 10 kilodaltons and 1000 kilodaltons.

8. The aqueous solution of claim 3, wherein the polymer conjugated to the polypeptide has a molecular weight of between 10 kilodaltons and 1000 kilodaltons.

9. The aqueous solution of claim 4, wherein the polymer conjugated to the polypeptide has a molecular weight of between 10 kilodaltons and 1000 kilodaltons.

10. The aqueous solution of claim 1, wherein the aqueous solution comprises between 0.1 mg/ml and 0.5 mg/ml of the polymer conjugated to the polypeptide.

11. The aqueous solution of claim 10, wherein the aqueous solution comprises between 0.2 mg/ml and 0.3 mg/ml of the polymer conjugated to the polypeptide.

12. The aqueous solution of claim 3, wherein the aqueous solution comprises between 0.2 mg/ml and 0.3 mg/ml of the polymer conjugated to the polypeptide.

13. The aqueous solution of claim 4, wherein the aqueous solution comprises between 0.2 mg/ml and 0.3 mg/ml of the polymer conjugated to the polypeptide.

14. A composition comprising:
    an aqueous solution; and
    a polymer conjugated to a polypeptide dissolved in the aqueous solution;
    wherein the polymer is formed from monomers comprising methacrylic acid conjugated to a polypeptide and hydroxyethylmethacrylate;
    wherein the polymer is crosslink free;
    wherein the polymer has a linear backbone;
    wherein a substantially similar polymer that is not conjugated to the polypeptide is insoluble in water at 37° C.;
    wherein the weight percentage of the polypeptide relative to the polymer conjugated to the polypeptide is sufficiently high to render the polymer conjugated to the polypeptide water soluble in the aqueous solution at 25° C.;
    wherein the polypeptide comprises an RGD sequence; and
    wherein the polypeptide is selected from the group of a vitronectin polypeptide, a collagen polypeptide, a laminin polypeptide, a bone sialoprotein polypeptide, and a fibronectin polypeptide.

15. A method of forming a coated cell culture article comprising the steps of:
    disposing an aqueous solution onto a surface upon which cells can be cultured, the aqueous solution comprising:
        a polymer conjugated to a polypeptide formed from polymerization of (i) methacrylic acid conjugated to the polypeptide and (ii) hydroxyethylmethacrylate,
        wherein the polymer has a linear backbone,
        wherein the polymer is crosslink free,
        wherein the weight percentage of the polypeptide relative to the polymer conjugated to the polypeptide is sufficiently high to render the polymer conjugated to the polypeptide water soluble at 25° C.,
        wherein the polypeptide comprises an RGD sequence, and
        wherein the polypeptide is selected from the group of a vitronectin polypeptide, a collagen polypeptide, a laminin polypeptide, a bone sialoprotein polypeptide, and a fibronectin polypeptide;
    exposing the aqueous solution and the surface to heat or electromagnetic radiation; and,
    producing a coated cell culture article having the polymer conjugated to the polypeptide attached to the surface.

* * * * *

UNITED STATES PATENT AND TRADEMARK OFFICE
CERTIFICATE OF CORRECTION

PATENT NO. : 10,941,312 B2  
APPLICATION NO. : 16/196516  
DATED : March 9, 2021  
INVENTOR(S) : Anthony Glenn Frutos et al.

Page 1 of 1

It is certified that error appears in the above-identified patent and that said Letters Patent is hereby corrected as shown below:

On the Title Page

On page 2, in Column 2, item (56), Other Publications, Line 2, delete "Cyclontron Reosnance" and insert -- Cyclotron Resonance --, therefor.

On page 2, in Column 2, item (56), Other Publications, Line 5, delete "micropatterningcombined" and insert -- micropatterning combined --, therefor.

On page 2, in Column 2, item (56), Other Publications, Line 8, delete ""Platlet-Rich" and insert -- "Platelet-rich --, therefor.

Signed and Sealed this  
Eighth Day of June, 2021

Drew Hirshfeld  
*Performing the Functions and Duties of the*  
*Under Secretary of Commerce for Intellectual Property and*  
*Director of the United States Patent and Trademark Office*